US012391153B2

(12) United States Patent
Sugiyama et al.

(10) Patent No.: US 12,391,153 B2
(45) Date of Patent: Aug. 19, 2025

(54) VEHICLE SEAT

(71) Applicant: TS TECH CO., LTD., Asaka (JP)

(72) Inventors: Shinji Sugiyama, Tochigi (JP); Akira Miyoshi, Tochigi (JP)

(73) Assignee: TS TECH CO., LTD., Saitama (JP)

( * ) Notice: Subject to any disclaimer, the term of this patent is extended or adjusted under 35 U.S.C. 154(b) by 0 days.

(21) Appl. No.: 18/441,827

(22) Filed: Feb. 14, 2024

(65) Prior Publication Data

US 2024/0181939 A1 Jun. 6, 2024

Related U.S. Application Data

(63) Continuation of application No. 18/066,130, filed on Dec. 14, 2022, now Pat. No. 11,945,343, which is a (Continued)

(30) Foreign Application Priority Data

Oct. 19, 2016 (JP) .................. 2016-205195

(51) Int. Cl.
*B60N 2/90* (2018.01)
*B60N 2/02* (2006.01)
(Continued)

(52) U.S. Cl.
CPC ............ *B60N 2/2222* (2013.01); *B60N 2/22* (2013.01); *B60N 2/64* (2013.01); *B60N 2/643* (2013.01);
(Continued)

(58) Field of Classification Search
CPC .... B60N 2/986; B60N 2002/026; B60N 2/99; B60N 2/026
See application file for complete search history.

(56) References Cited

U.S. PATENT DOCUMENTS 4,655,505 A 4/1987 Kashiwamura et al.
8,078,364 B2 12/2011 Mabuchi et al.
(Continued)

FOREIGN PATENT DOCUMENTS

CN 101786427 7/2010
DE 102007047914 6/2008
(Continued)

OTHER PUBLICATIONS

International Search Report issued for International Patent Application No. PCT/JP2017/028022, date of mailing Sep. 19, 2017, 5 pages including English translation.
(Continued)

*Primary Examiner* — Timothy J Brindley
(74) *Attorney, Agent, or Firm* — HSML P.C.

(57) ABSTRACT

A car seat includes an actuator capable of changing an orientation of a rest surface of a seat back laterally by turning and moving at least a side portion frame that is part of the car seat frontward and rearward, and a controller configured to exercise control over the actuator. The controller includes a run-time posture support unit configured to execute a run-time posture support control under which when a car makes a turn, the actuator is regulated to cause the rest surface of the seat back to be oriented in a direction of the turn. The run-time posture support unit is configured to regulate the actuator in accordance with a placement of the seat in the car, when the run-time posture support unit executes the run-time posture support control.

11 Claims, 19 Drawing Sheets

Related U.S. Application Data continuation of application No. 16/343,677, filed as application No. PCT/JP2017/028022 on Aug. 2, 2017, now Pat. No. 11,541,785.

(51) Int. Cl.

| | | |
|---|---|---|
| *B60N 2/22* | (2006.01) | |
| *B60N 2/64* | (2006.01) | |
| *B60N 2/68* | (2006.01) | |
| *B60W 40/08* | (2012.01) | |

(52) U.S. Cl.
CPC .............. *B60N 2/646* (2013.01); *B60N 2/68* (2013.01); *B60N 2/986* (2018.02); *B60N 2/99* (2018.02); *B60N 2/026* (2023.08); *B60W 2040/0827* (2013.01)

(56) References Cited

U.S. PATENT DOCUMENTS

| | | |
|---|---|---|
| 8,478,491 B2 | 7/2013 | Miyajima et al. |
| 9,079,509 B2 | 7/2015 | Sugiyama et al. |
| 9,283,868 B2 | 3/2016 | Sugiyama |
| 9,751,434 B2 | 9/2017 | Sugiyama et al. |
| 9,868,366 B2 | 1/2018 | Sugiyama |
| 10,166,888 B2 | 1/2019 | Sugiyama |
| 2003/0023363 A1 | 1/2003 | Katz et al. |
| 2009/0218858 A1 | 9/2009 | Lawall et al. |
| 2010/0191426 A1 | 7/2010 | Miyajima et al. |
| 2013/0241254 A1 | 9/2013 | Sugiyama et al. |
| 2014/0225412 A1 | 8/2014 | Sugiyama |
| 2015/0274042 A1 | 10/2015 | Sugiyama et al. |
| 2016/0144743 A1 | 5/2016 | Sugiyama |
| 2016/0221481 A1 | 8/2016 | Sugiyama |
| 2017/0043681 A1 | 2/2017 | Seiller et al. |
| 2017/0158088 A1 | 6/2017 | Pike et al. |
| 2017/0267124 A1 | 9/2017 | Numazawa et al. |
| 2017/0334322 A1 | 11/2017 | Sugiyama et al. |
| 2018/0009348 A1 | 1/2018 | Deshmukh |
| 2018/0093589 A1 | 4/2018 | Sugiyama |
| 2018/0105067 A1 | 4/2018 | Ajisaka |
| 2019/0255971 A1 | 8/2019 | Sakato |
| 2019/0291617 A1 | 9/2019 | Schlierf et al. |
| 2019/0366888 A1 | 12/2019 | Saigo et al. |

FOREIGN PATENT DOCUMENTS

| | | |
|---|---|---|
| DE | 102016221507 | 5/2018 |
| FR | 3086605 | 4/2020 |
| GB | 2468567 | 9/2010 |
| JP | S60197437 | 10/1985 |
| JP | S61181730 | 8/1986 |
| JP | H05229372 | 9/1993 |
| JP | H07163439 | 6/1995 |
| JP | 2003002094 | 1/2003 |
| JP | 2008049837 | 3/2008 |
| JP | 2010173372 | 8/2010 |
| JP | 2010260486 | 11/2010 |
| JP | 2013049356 | 3/2013 |
| JP | 2013189141 | 9/2013 |
| JP | 2014189127 | 10/2014 |
| JP | 2015058794 | 3/2015 |
| KR | 20190031699 | 3/2019 |

OTHER PUBLICATIONS

Office Action issued for Japanese Patent Application No. 2016-205195, Dispatch Date: Jun. 2, 2020, 7 pages including English translation.
Office Action issued for Japanese Patent Application No. 2016-205195, Dispatch Date: Oct. 20, 2020, 4 pages including English translation.
Office Action issued for Chinese Patent Application No. 201780071776.4, dated Apr. 25, 2021, 19 pages including English translation.
First Office Action issued for Chinese Patent Application No. 202210278824.X, dated Dec. 8, 2023, 24 pages including English machine translation of the rejection.
Notice of Reasons for Refusal issued for Japanese Patent Application No. 2023-111256, Dispatch date: Jan. 23, 2024, 8 pages including English machine translation.

FIG.2
(a)
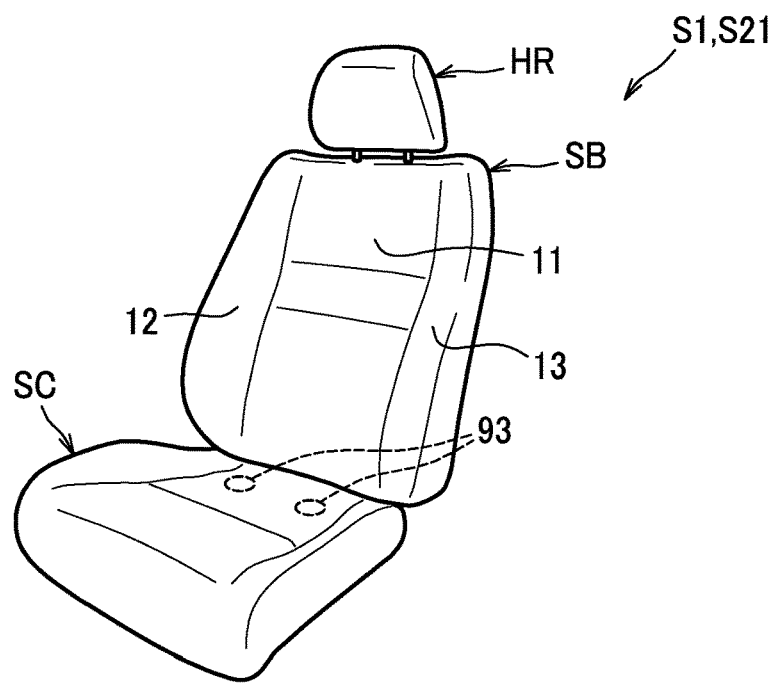
(b)
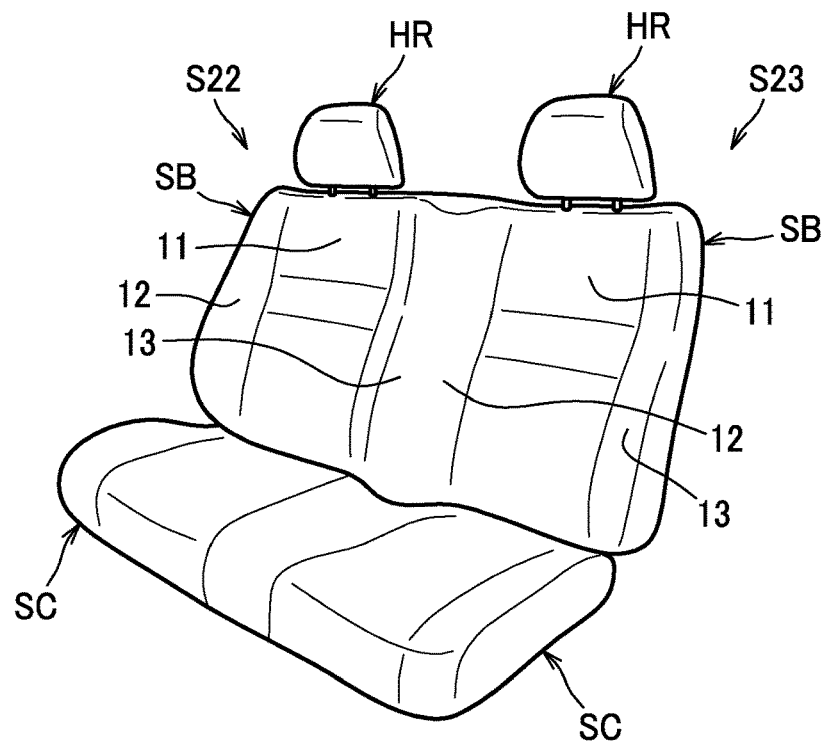

FIG.4
(a)
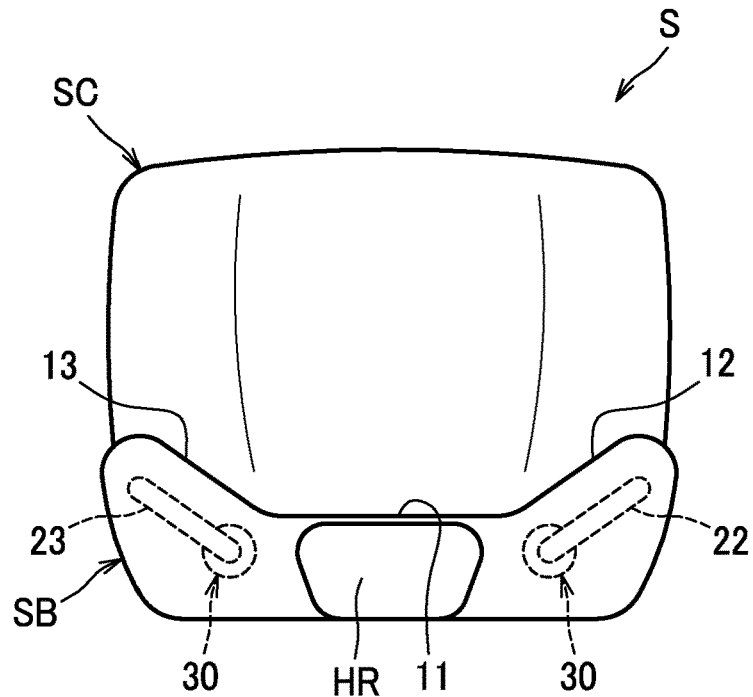
(b)
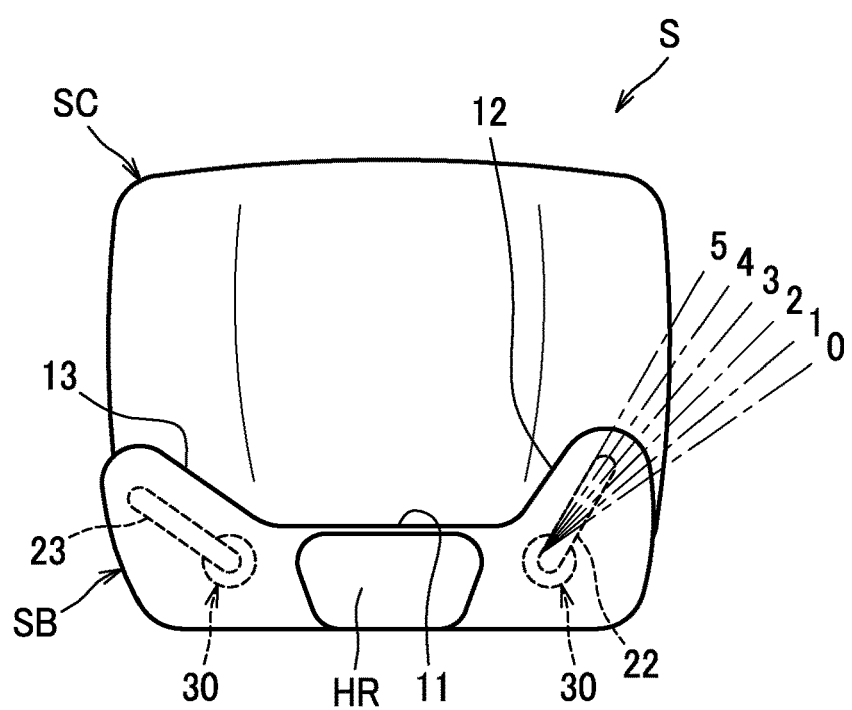

FIG.7

|  | UNDER RUN-TIME POSTURE SUPPORT CONTROL | | | UNDER ALERT CONTROL |
|---|---|---|---|---|
|  | MANUAL DRIVING MODE | | AUTONOMOUS DRIVING MODE |  |
|  | $GC \geqq GCth1$ | $GC \geqq GCth2$ |  |  |
| DRIVER'S SEAT | 1 | 2 | +1 | 5 |
| PASSENGER SEAT | +0.5 (1.5) | +0.5 (2.5) | +0.5 | — |
| REAR SEAT | +1 (2) | +1 (3) | +1 | — |

FIG.11
(a)
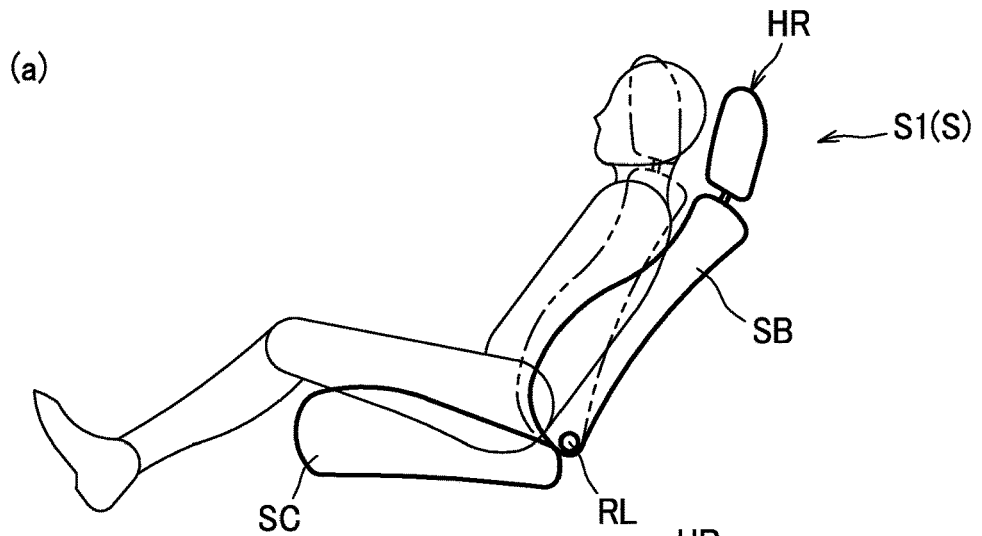
(b)
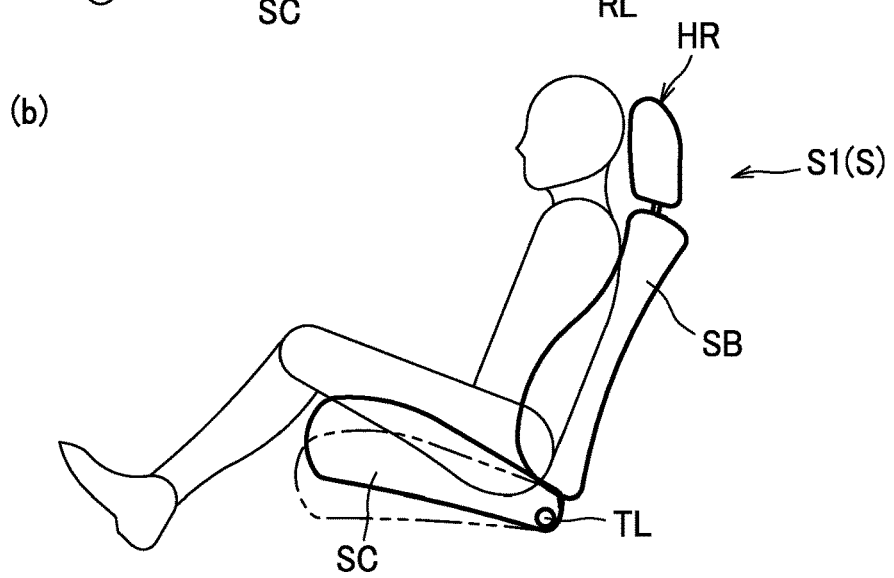
(c)
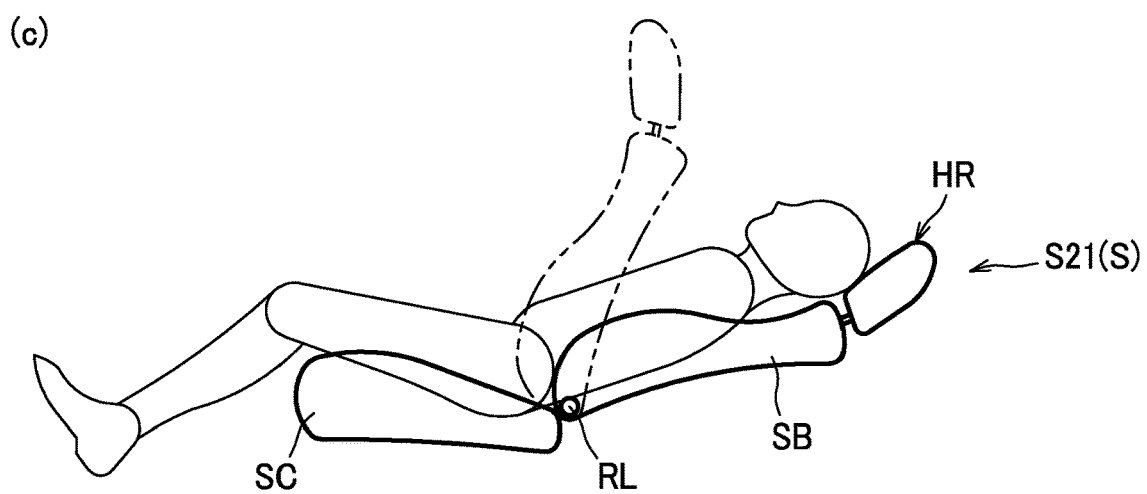

FIG.13

|  | UNDER RUN-TIME POSTURE SUPPORT CONTROL | | |
|---|---|---|---|
|  | MANUAL DRIVING MODE | | AUTONOMOUS DRIVING MODE |
|  | $GC \geqq GCth1$ | $GC \geqq GCth2$ |  |
| DRIVER'S SEAT | 1 | 2 | +1 |
| PASSENGER SEAT | +0.5 (1.5) | +0.5 (2.5) | +0.5 |
| MIDDLE ROW SEAT | +1.5 (2.5) | +1.5 (3.5) | +1.5 |
| THIRD ROW SEAT | +1 (2) | +1.5 (3.5) | +1.5 |

FIG.14
(a)
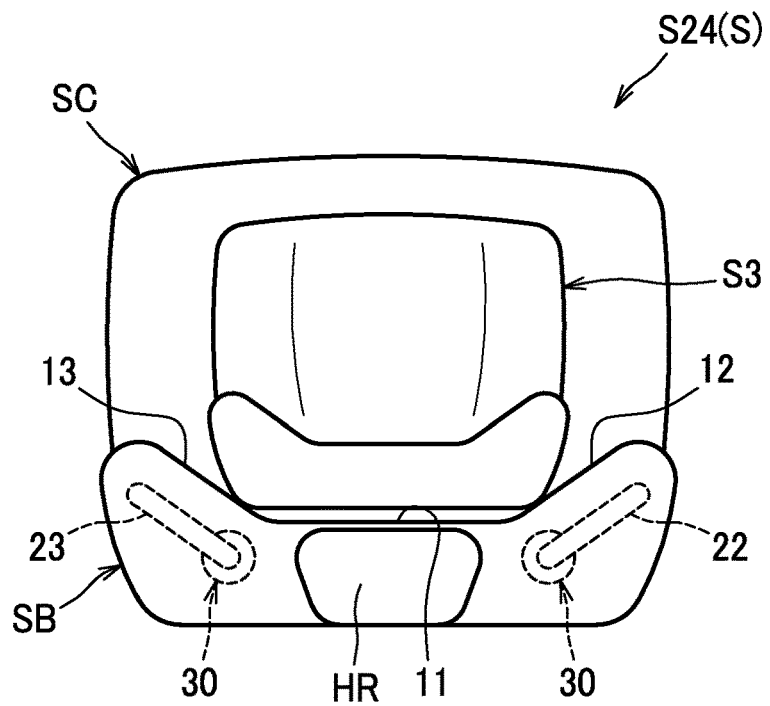
(b)
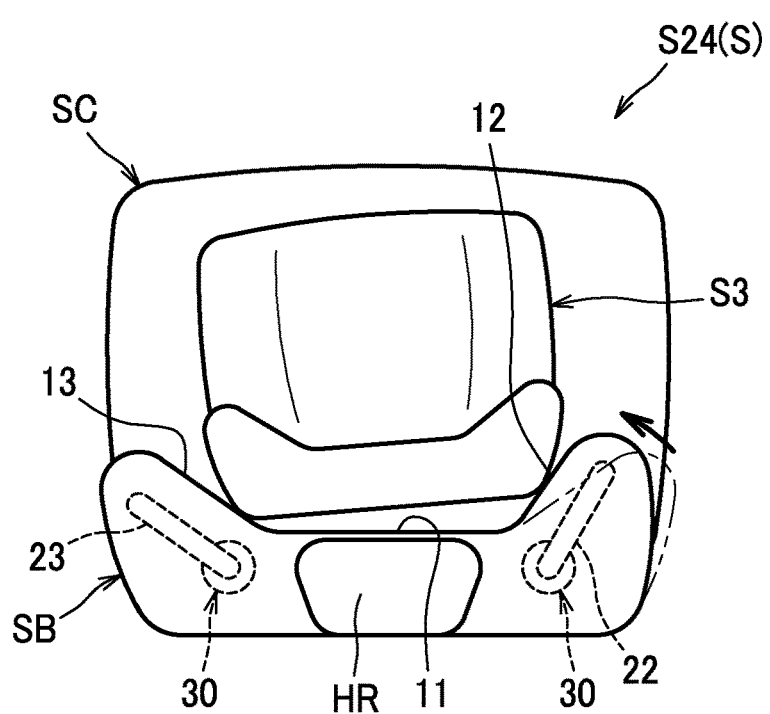

FIG.17
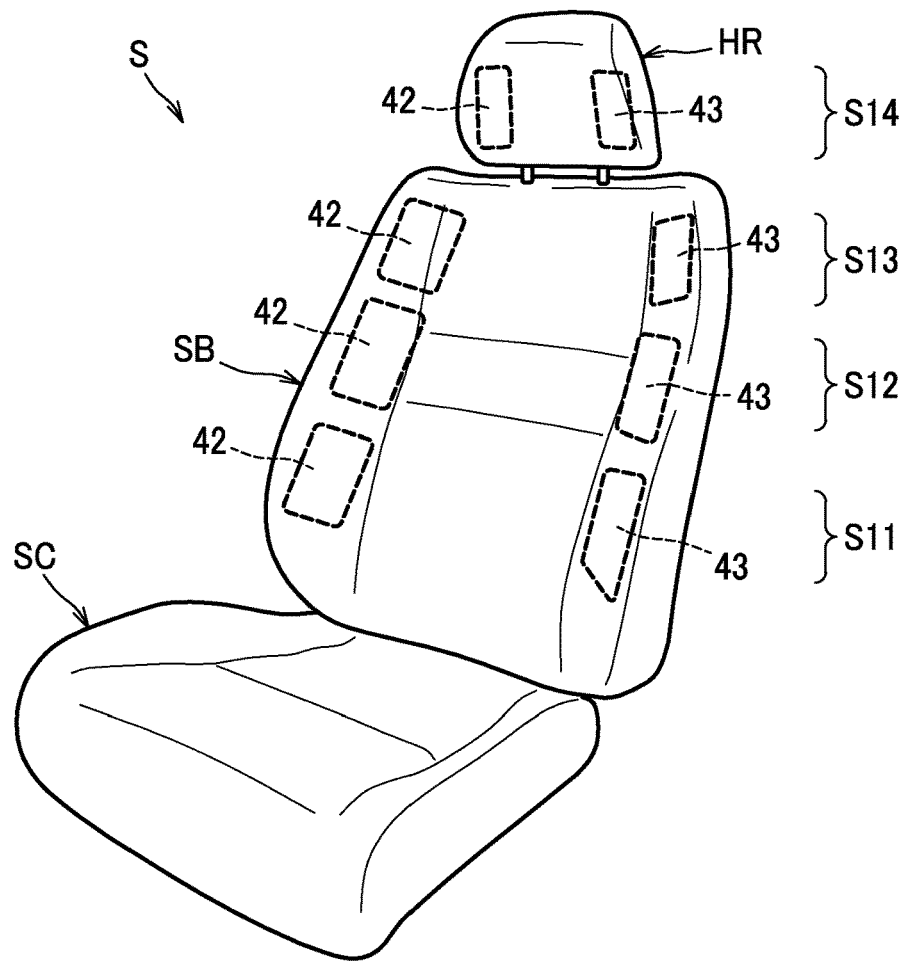
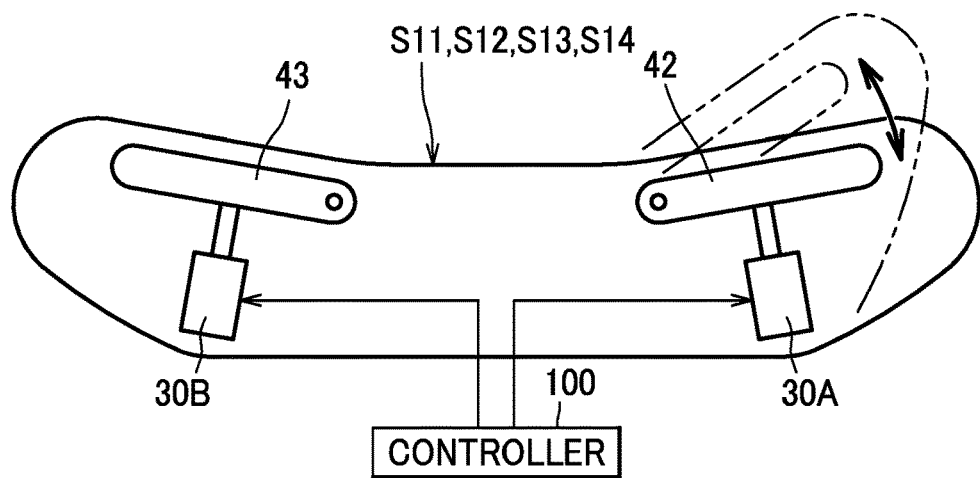

| | UNDER RUN-TIME POSTURE SUPPORT CONTROL | | | WORSENING OF CONDITION OF WAKEFULNESS DETECTED |
|---|---|---|---|---|
| | MANUAL DRIVING MODE | | AUTONOMOUS DRIVING MODE | |
| | $GC \geqq GCth1$ | $GC \geqq GCth2$ | | |
| DRIVER'S SEAT | 1 | 2 | +1 | 5 (ALERT: LEFT-RIGHT ALTERNATE) |
| PASSENGER SEAT | +0.5 (1.5) | +0.5 (2.5) | +0.5 | +0.5 |
| REAR SEAT | +1 (2) | +1 (3) | +1 | +1.5 |

(b)

| | UNDER RUN-TIME POSTURE SUPPORT CONTROL | | | WORSENING OF CONDITION OF WAKEFULNESS DETECTED |
|---|---|---|---|---|
| | MANUAL DRIVING MODE | | AUTONOMOUS DRIVING MODE | |
| | $GC \geqq GCth1$ | $GC \geqq GCth2$ | | |
| DRIVER'S SEAT | 1 | 2 | +1 | 5 (ALERT: LEFT-RIGHT ALTERNATE) |
| PASSENGER SEAT | +0.5 (1.5) | +0.5 (2.5) | +0.5 | +0.5 |
| MIDDLE ROW SEAT | +1.5 (2.5) | +1.5 (3) | +1.5 | +1.5 |
| THIRD ROW SEAT | +1 (2) | +1.5 (3.5) | +1.5 | +1.5 |

FIG.19

|  | UNDER RUN-TIME POSTURE SUPPORT CONTROL | | | | |
|---|---|---|---|---|---|
|  | MANUAL DRIVING MODE | | | | AUTONOMOUS DRIVING MODE |
|  | LOW SPEED | | HIGH SPEED | | |
|  | STEERING ANGLE: LESS | STEERING ANGLE GREATER | STEERING ANGLE: LESS | STEERING ANGLE GREATER | |
| DRIVER'S SEAT | 1 | 2 | 1.5 | 3 | +1 |
| PASSENGER SEAT | +0.5 | +0.5 | +0.5 | +0.5 | +0.5 |
| REAR SEAT | +1 | +1 | +1 | +1 | +1 |
| MIDDLE ROW SEAT | +1.5 | +1.5 | +1.5 | +1.5 | +1.5 |
| THIRD ROW SEAT | +1 | +1.5 | +1 | +1.5 | +1.5 |

VEHICLE SEAT

TECHNICAL FIELD

The present invention relates to a vehicle seat having a rest surface adjustable in lateral orientation.

BACKGROUND ART

A vehicle seat of which a rest surface is rendered adjustable in lateral orientation is known in the art. For example, Patent Documents 1 to 3 disclose a vehicle seat comprising a seat back of which a rest surface orientation can be changed to the left or to the right by turning a plate member, referred to as back plate or pressure-receiving member, disposed between left and right side frames of the seat back.

As alternatives to the mechanisms disclosed in Patent Documents 1 to 3, various other mechanisms for changing the orientation of the rest surface of the seat back, such as a side support actuating mechanism, for example, as disclosed in Patent Document 4, may be utilized. To be more specific, a cable pulling mechanism is provided to cause left and right side support devices constituting the side support actuating mechanism to be actuated independently so that, for example, the left side support device may be actuated to turn the left support member forward, thereby causing the left side portion of the seat back to be pushed out forward. The seat back with its left side portion pushed out forward this way resultantly appears to have its rest surface as a whole oriented to the right; accordingly, the orientation of the rest surface of the seat back can be changed herein.

CITATION LIST

Patent Literature

Patent Document 1: JP 2013-049356 A
Patent Document 2: JP 2013-189141 A
Patent Document 3: JP 2015-058794 A
Patent Document 4: JP 2014-189127 A

SUMMARY OF INVENTION

Hereupon, it would be desirable that the orientation of the rest surface of a vehicle seat can be changed in accordance with a situation experienced by an occupant seated on the vehicle seat.

With this in view, it is an object of the present invention to provide a vehicle seat with a rest surface of which an orientation can be changed in accordance with a situation experienced by an occupant.

It is another object of the present invention to propose various utilizations of a rest surface orientation changeable vehicle seat.

It is yet another object of the present invention to improve comfort.

It is yet another object of the present invention to ensure greater ease in boarding and alighting.

It is yet another object of the present invention to enhance the effect of shaking off drowsiness.

It is yet another object of the present invention to downsize an actuator for changing the orientation of a rest surface.

It is yet another object of the present invention to allow a rest surface to be changed in orientation with a specified amount varying according to occupant's preference.

It is yet another object of the present invention to let an occupant be notified of information about the currently specified amount of change in orientation of a rest surface.

In order to achieve any of the aforementioned objects, a vehicle seat according to the present invention comprises: an actuator capable of changing an orientation of a rest surface laterally by moving at least part of the seat; and a controller configured to exercise control over the actuator, wherein the controller comprises a run-time posture support unit configured to execute a run-time posture support control under which when a vehicle makes a turn, the actuator is regulated to cause the rest surface to be oriented in a direction of the turn, and wherein the run-time posture support unit is configured to regulate the actuator in accordance with a placement of the seat in the vehicle, when the run-time posture support unit executes the run-time posture support control.

With this configuration, the orientation of the rest surface can be changed in accordance with a situation experienced by an occupant.

In the vehicle seat as described above, the vehicle seat may include a driver's seat and a second seat that is a seat other than the driver's seat, and the run-time posture support unit may be configured to set an amount of change in orientation of a rest surface of the second seat to be greater than an amount of change in orientation of a rest surface of the driver's seat, when the run-time posture support unit executes the run-time posture support control.

With this configuration, although an occupant seated on the second seat is not a driver who himself/herself drives the vehicle and thus would possibly fail to assume an appropriate posture sufficiently responsive to the direction of a turn, the occupant seated on the second seat can be received satisfactorily by the rest surface when the vehicle makes a turn because the amount of change in orientation of the rest surface of the second seat is set to be greater than the amount of change in orientation of the rest surface of the driver's seat. Accordingly, the comfort can be improved.

In the vehicle seat as described above, the second seat may include a passenger seat disposed at a right or left side of the driver's seat, and rear seats disposed in a rear of the driver's seat and in a rear of the passenger seat, and the run-time posture support unit may be configured to set an amount of change in orientation of rest surfaces of the rear seats to be equal to or greater than an amount of change in orientation of a rest surface of the passenger seat, when the run-time posture support unit executes the run-time posture support control.

With this configuration, the occupant who is seated on the rear seat and thus would have a forward visibility poorer than that which the occupant seated on the passenger seat would have can be received satisfactorily by the rest surface, because the amount of change in orientation of the rest surfaces of the rear seats, in particular, is set to be greater than the amount of change in orientation of the rest surface of the passenger seat. Accordingly, the comfort can be improved.

In the vehicle seat as described above, the run-time posture support unit may be configured such that the amount of change in orientation of the rest surface set when the run-time posture support unit executes the run-time posture control is greater if the vehicle is in an autonomous driving mode with an automatic steering feature enabled than if the vehicle is in a manual driving mode with the automatic steering feature disabled.

With this configuration, although an occupant himself/herself does not do the steering in the autonomous driving mode and thus would possibly fail to assume an appropriate posture sufficiently responsive to the direction of a turn, the occupant can be received satisfactorily by the rest surface when the vehicle makes a turn because the amount of change in orientation of the rest surface set if the vehicle is in the autonomous driving mode is greater than the amount of change in orientation of the rest surface if the vehicle is in the manual driving mode. Accordingly, the comfort can be improved.

In the vehicle seat as described above, the controller may comprise: a boarding/alighting detection unit configured to detect an indication of boarding and alighting of a passenger; and a boarding/alighting assisting unit configured to regulate the actuator to thereby orient the rest surface toward a doorway of the vehicle, if the boarding/alighting detection unit detects boarding into and/or alighting from the vehicle, of a passenger.

With this configuration, the rest surface can be turned to such a large extent as to become oriented toward the doorway of the vehicle, making the boarding and alighting easier. Accordingly, the increased case in boarding and alighting can be ensured.

In the vehicle seat as described above, the controller may comprise: a wakefulness detection unit configured to detect a condition of wakefulness of a driver; and an alerting unit configured to execute an alert control under which when the wakefulness detection unit detects worsening of the condition of wakefulness of the driver, the actuator is regulated to change an orientation of the rest surface, wherein an amount of change in orientation of the rest surface set when the alert control is executed is greater than an amount of change in orientation of the rest surface set when the alert control is not executed.

With this configuration, the enhanced effect of shaking off drowsiness can be ensured because the amount of change in orientation of the rest surface set when the alert control is executed can be made greater.

In the vehicle seat as described above, the controller may comprise: a wakefulness detection unit configured to detect a condition of wakefulness of a driver; and an alerting unit configured to execute an alert control under which when the wakefulness detection unit detects worsening of the condition of wakefulness of the driver, the actuator is regulated to change an orientation of the rest surface, wherein the run-time posture support unit is configured such that the amount of change in orientation of the rest surface set when the run-time posture support unit executes the run-time posture control is greater if the vehicle is in an autonomous driving mode with an automatic steering feature enabled than if the vehicle is in a manual driving mode with the automatic steering feature disabled, and wherein an amount of change in orientation of the rest surface set when the alert control is executed is greater than an amount of change in orientation of the rest surface set if the vehicle is in the autonomous driving mode when the run-time posture control is executed.

With this configuration, the enhanced effect of shaking off drowsiness can be ensured because the amount of change in orientation of the rest surface set when the alert control is executed can be made greater.

In the vehicle seat as described above, the controller may comprise: a boarding/alighting detection unit configured to detect an indication of boarding and alighting of a passenger; a boarding/alighting assisting unit configured to execute a boarding/alighting assisting control under which the actuator is regulated to orient the rest surface toward a doorway of the vehicle, if the boarding/alighting detection unit detects boarding into and/or alighting from the vehicle, of a passenger; a wakefulness detection unit configured to detect a condition of wakefulness of a driver; and an alerting unit configured to execute an alert control under which when the wakefulness detection unit detects worsening of the condition of wakefulness of the driver, the actuator is regulated to change an orientation of the rest surface, wherein an amount of change in orientation of the rest surface set when the boarding/alighting assisting control is executed is greater than an amount of change in orientation of the rest surface set when the alert control is executed.

With this configuration, when the boarding/alighting assisting control is executed, the rest surface can be turned to such a large extent as to become oriented toward the doorway of the vehicle, making the boarding and alighting easier. Accordingly, the increased case in boarding and alighting can be ensured.

In the vehicle seat as described above, the controller may comprise: a traveling direction information acquisition unit configured to acquire information on a traveling direction in which the vehicle is to be headed; and a turn notification unit configured such that based on information on the traveling direction acquired by the traveling direction information acquisition unit, the actuator is regulated to change an orientation of the rest surface, thereby notifying an occupant of the turn, before the vehicle makes the turn.

With this configuration, before the vehicle turns, the turn is indicated to the occupant; therefore, unintentional omission of making a turn at an intersection can be avoided and the posture can be corrected beforehand in accordance with the direction of the turn. Accordingly, the comfort can be improved.

The vehicle seat as described above may comprise a seat central portion and left and right seat side portions, the seat side portions being provided at left and right sides of the seat central portion, the seat side portions being so shaped as to jut out farther than the seat central portion to a side on which an occupant is to be seated, in a normal position, and the actuator may be configured to move at least part of the seat side portions from the normal position in a direction toward or away from the occupant to be seated, to thereby change an orientation of the rest surface.

With this configuration, the actuator for changing the orientation of a rest surface can be downsized in comparison with an alternative configuration in which the orientation of the rest surface is changed by moving the seat in entirety.

The vehicle seat as described above may comprise a first support portion provided to support a first region of an occupant, and a second support portion provided to support a second region, different from the first region, of the occupant, and the actuator may include a first actuator configured to change an orientation of a rest surface of the first support portion laterally, and a second actuator configured to change an orientation of a rest surface of the second support portion laterally, wherein the run-time posture support unit may be configured to set an amount of change in orientation of the rest surface of the second support surface to be smaller than an amount of change in orientation of the rest surface of the first support surface, when the run-time posture support unit executes the run-time posture support control.

With this configuration, when the vehicle makes a turn, several regions of the occupant can be satisfactorily received respectively by the properly oriented rest surfaces of the corresponding support portions. Accordingly, the comfort can be improved.

In the vehicle seat as described above, the controller may comprise a configuration unit through which an amount of change in orientation of the rest surface is set based upon information inputted manually by an occupant, and the run-time posture support unit may be configured such that if the configuration unit has set the amount of change in orientation of the rest surface, the actuator is regulated in accordance with the amount of change in orientation of the rest surface set by the configuration unit.

With this configuration, the amount of change in orientation of the rest surface can be set according to occupant's preference.

In the vehicle seat as described above, the configuration unit may be configured to permit the amount of change in orientation of the rest surface to be set at any value selected among amounts of change including zero.

With this configuration, the amounts of change in orientation of the rest surface, selectable among values including one which offers the option of not changing the orientation of the rest surface (i.e., not executing the run-time posture support control) can be specified according to occupant's preference.

In the vehicle seat as described above, the controller may comprise a display unit configured to display information on an amount of change in orientation of the rest surface which is currently set.

With this configuration, the information on the amount of change in orientation of the rest surface which is currently set can be presented to the occupant.

BRIEF DESCRIPTION OF DRAWINGS

FIG. 2 includes perspective views showing car seats as the vehicle seat; a view (a) showing a driver's seat or a passenger seat, and a view (b) showing rear seats.

FIG. 4 is a view of the car seat as seen from above; a view (a) showing a state in which side portion frames are in a normal position, and (b) showing a state in which a right side portion frame has been turned forward.

FIG. 7 is a table showing an example of settings for a run-time posture support control and an alert control according to an exemplified embodiment.

FIG. 11 includes side views of the car seat; a view (a) showing a state in which a seat back is put back, a view (b) showing a state in which a seat cushion is tipped up with its front end raised up, and (c) showing a state in which the seat back is laid down.

FIG. 13 is a diagram showing an example of settings for a run-time posture support control according to another embodiment.

FIG. 14 includes a view (a) of a car seat on which a child seat is attached as seen from above, and a view (b) for explaining an operation under the run-time posture support control.

FIG. 17 includes a perspective view (a) of a car seat according to another embodiment, and a view (b) showing an example of construction for changing an orientation of a rest surface.

FIG. 18 includes tables (a) and (b) showing examples of settings for a run-time posture support control and for a control to be executed when a condition of wakefulness of an occupant has been worsened.

FIG. 19 is a table showing an example of settings for a run-time posture support control according to yet another embodiment.

DESCRIPTION OF EMBODIMENTS

Hereafter, a description will be given of an illustrative embodiment of the present invention with reference made to the accompanying drawings. In this description, the front/rear (frontward/rearward), left/right (leftward/rightward; lateral), upper/lower (upward/downward; vertical) are designated with reference to the front/rear, left/right and upper/lower directions of a vehicle in which vehicle seats are installed.

Figure 1:
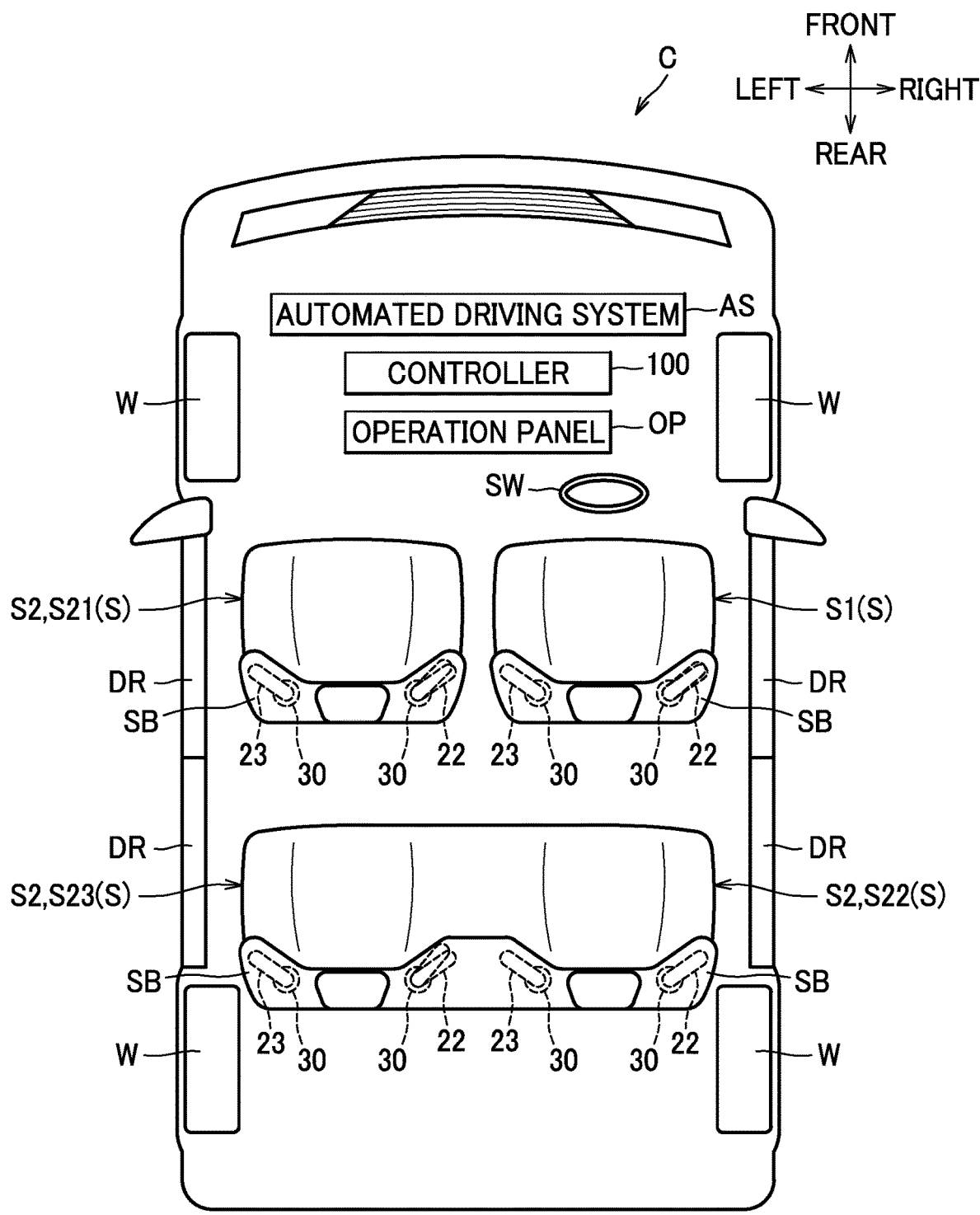
FIG. 1 is a view showing a vehicle in which vehicle seats according to an exemplified embodiment of the present invention is installed.

As shown in FIG. 1, a vehicle seat according to the present embodiment is configured as a car seat S installed in a car C (automobile) as an example of a vehicle.

The car seat S includes a driver's seat S1 for a driver to be seated thereon, and a second seat S2 that is a seat other than the driver's seat S1. In the present embodiment, the second seat S2 includes a passenger seat S21 disposed at a left side of the driver's seat S1, a rear seat S22 disposed in a rear of the driver's seat S1, and a rear seat S23 disposed in a rear of the passenger seat S21. The rear seats S22, S23 are combined together to form one integral seat. It is to be understood that the passenger seat may be disposed at a right side of the driver's seat S1. It is also to be understood that the rear seats S22, S23 may be constructed as separate seats that are not combined with each other.

The car C includes a steering wheel SW to be manipulated by a driver, and an operation panel OP provided on an instrument panel. At left or right outer sides of the seats S1, S21, S22, S23 with reference to the left-side and right-side directions of the car C (in the present embodiment, at the right sides of the seats S1, S22 and at the left sides of the seats S21, S23), doors DR are provided, respectively, in an openable and closeable manner on a vehicle body. A passenger (or a driver) who is going to be an occupant seated on each seat S1, S21, S22, S23 may open a door DR at the left or right of the seat he/she wants to sit on, so that he/she can board on and alight from the car C through a doorway of the car C.

In addition, the car C includes an automated driving system AS, and is configured to be operated with selectively adoptable two modes: an autonomous driving mode in which the automated driving system AS performs automatic steering; and a manual driving mode in which the automated driving system AS does not perform such automatic steering and the driver is required to do the steering. Selection between the autonomous driving mode and the manual driving mode may be carried out, for example, by the driver operating the operation panel OP. It is to be understood that the autonomous driving mode may be such a mode that the automated driving system AS performs the automatic steering, but does not perform automatic acceleration or braking, or may alternatively be such a mode that the automated driving system AS not only performs the automatic steering, but also performs at least one of the acceleration and the braking automatically.

As shown in FIGS. 2(a), (b), each seat S1, S21, S22, S23 includes a seat cushion SC, a seat back SB and a headrest HR. Furthermore, the seat back SB of each seat S1, S21, S22 and S23 includes a seat central portion 11 which faces a back of an occupant to be seated, and left and right seat side portions 12, 13 which are provided at left and right sides of the seat central portion 11 and so shaped as to jut out forward farther than the seat central portion 11 to a side on which an occupant is to be seated (more specifically, to the front side), in a normal position (position shown in FIG. 4(a)).

The seat cushion SC incorporates a seat cushion frame (not shown). The seat cushion SC is constructed of the seat cushion frame upholstered with padding made of urethane foam or the like and covering made of fabrics, leather or the like.

Figure 3:
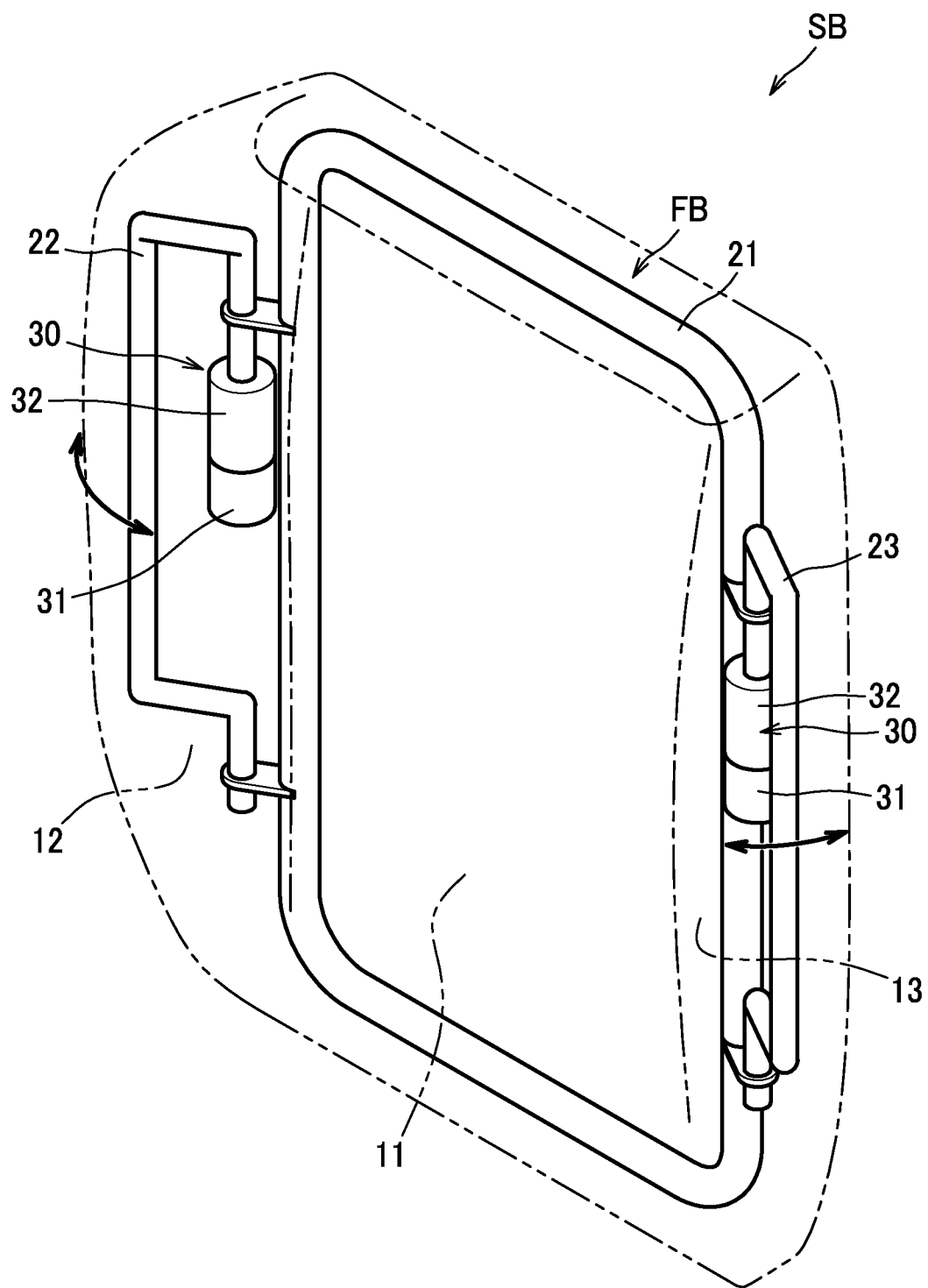
FIG. 3 is a perspective view showing an example of construction for changing an orientation of a rest surface.

The seat back SB incorporates a seat back frame FB, as shown in FIG. 3. The seat back frame FB includes a central portion frame 21 constituting a frame of the seat central portion 11, and side portion frames 22, 23 constituting frames of the left and right seat side portions 12, 13. The left and right side portion frames 22, 23 have rear end portions and front end portions, respectively, which are so provided that the rear end portions are pivotally joined to the central portion frame 21 whereby the front end portions are made swingable forward and backward. The seat back SB is constructed of the seat back frame FB upholstered with padding and covering.

Inside the seat back SB, actuators 30 for changing an orientation of a rest surface (i.e., a front side surface) of the seat back SB laterally are disposed. The actuators 30 are disposed, one at a left side and the other at a right side, in positions corresponding to the left and right side portion frames 22, 23, within the seat back SB. The actuators 30 are configured to move parts of the seat back SB, specifically, to rotate parts of the seat side portions 12, 13 (i.e., side portion frames 22, 23) so that the orientation of the rest surface of the seat back SB can be changed laterally. To be more specific, the actuators 30 are configured to cause the side portion frames 22, 23 to be turned from a normal position (see FIG. 4(a)) forward to thereby move in a direction toward an occupant seated or backward to thereby move in a direction backward away from an occupant seated, so that the orientation of the rest surface of the seat back SB can be changed laterally.

The actuators 30 as described above may, for example, each include a motor 31 and a gear box 32. The motor 31 is, for example, a stepping motor configured to have a capability of changing a direction of rotation of its shaft to a normal direction and to a reverse direction. The gear box 32 is a member in which gears (not shown) for transmitting rotary driving force of the motor 31 with reduced speed to the side portion frame 22, 23 are housed. The actuators 30 are fixed to the left and right portions of the central portion frame 21 by brackets (not shown).

In an inactive state as shown in FIG. 4(a), the seat side portions 12, 13 are in their normal positions where the seat side portions 12, 13 jut out frontward to a predetermined extent farther than the seat central portion 11. When the car C turns to the left, the motor 31 of the right actuator 30 is caused to rotate in the normal direction to cause the side portion frame 22 to be turned from the normal position forward to a forward position, as shown in FIG. 4(b), under the control of the controller 100 which will be described later. Accordingly, the seat side portion 12 is pushed from the normal position forward, and the front side surface of the seat side portion 12 is thereby oriented to the left, so that the rest surface of the seat back SB is oriented to the left as a whole. When the seat side portion 12 is to be returned to the normal position, the motor 31 of the right actuator 30 is caused to rotate in the reverse direction, and the side portion frame 22 is turned from the forward position as shown in FIG. 4(b) to the normal position as shown in FIG. 4(a).

When the car C turns to the right, the motor 31 of the left actuator 30 is, though not illustrated, caused to rotate in the normal direction under the control of the controller 100, to cause the side portion frame 23 to be turned from the normal position to the forward position. Accordingly, the seat side portion 13 is pushed from the normal position forward, and the front side surface of the seat side portion 13 is thereby oriented to the right, so that the rest surface of the seat back SB as a whole is oriented to the right. When the seat side portion 13 is to be returned to the normal position, the motor 31 of the left actuator 31 is caused to rotate in the reverse direction, and the side portion frame 23 is turned from the forward position to the normal position.

As described above, the actuator 30 is configured to cause the side portion frame 22, 23 to be turned, thereby causing the seat side portion 12, 13 to be pushed from the normal position forward, so that the orientation of the rest surface of the seat back SB can be changed laterally.

As shown in FIG. 4(b), the side portion frame 22, 23 can be turned between the normal position (O) and a fifth forward position (5) that is the foremost position to which it can reach when turned forward, and can be turned from the normal position forward to any position as desired between the normal position and the fifth forward position by controlling the time period of actuation of the actuator 30 (motor 31) appropriately. Moreover, in the present embodiment, the positions preset between the normal position and the fifth forward position include: a first forward position (1) that is forward of the normal position; a second forward position (2) that is forward of the first forward position; a third forward position (3) that is forward of the second forward position; and a fourth forward position (4) that is forward of the third forward position.

Figure 5:
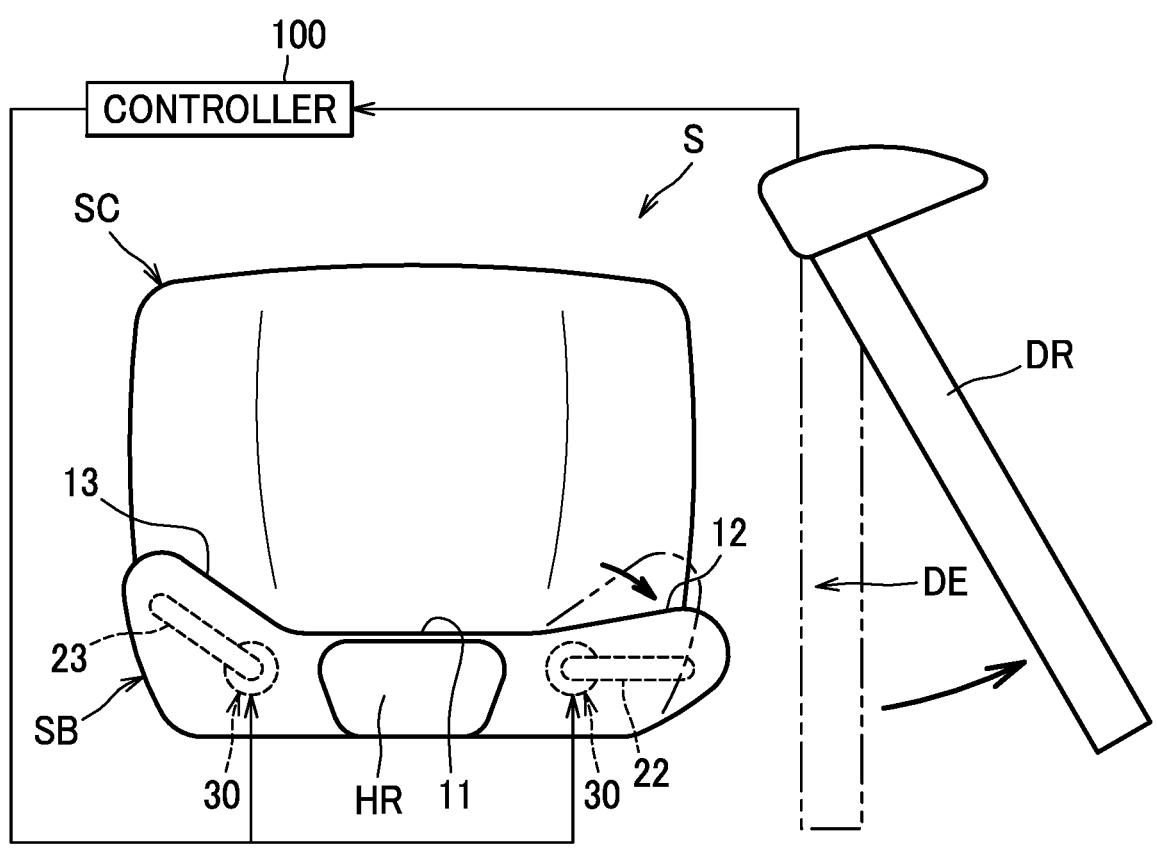
FIG. 5 is a view showing a state in which the right side portion frame has been turned backward when a door has been opened.

As shown in FIG. 5, when a door DR is opened, the motor 31 of the actuator 30 closer to the door DR (doorway DE) is caused to rotate in the reverse direction under the control of the controller 100, so that the side portion frame 22 closer to the doorway DE is turned from the normal position (see chain double-dashed lines) to a backward position that is a retreated position. Accordingly, the front side surface of the seat side portion 12 closer to the doorway DE is oriented to become a substantially flat surface relative to the front side surface of the seat central portion 11, so that the rest surface of the seat back SB is oriented toward the doorway DE as a whole. When the seat side portion 12 closer to the doorway DE is to be returned to the normal position, the motor 31 of the actuator 30 closer to the doorway DE is caused to rotate in the normal direction, so that the side portion frame 22 closer to the doorway DE is turned from the retreated position to the normal position.

Figure 6:
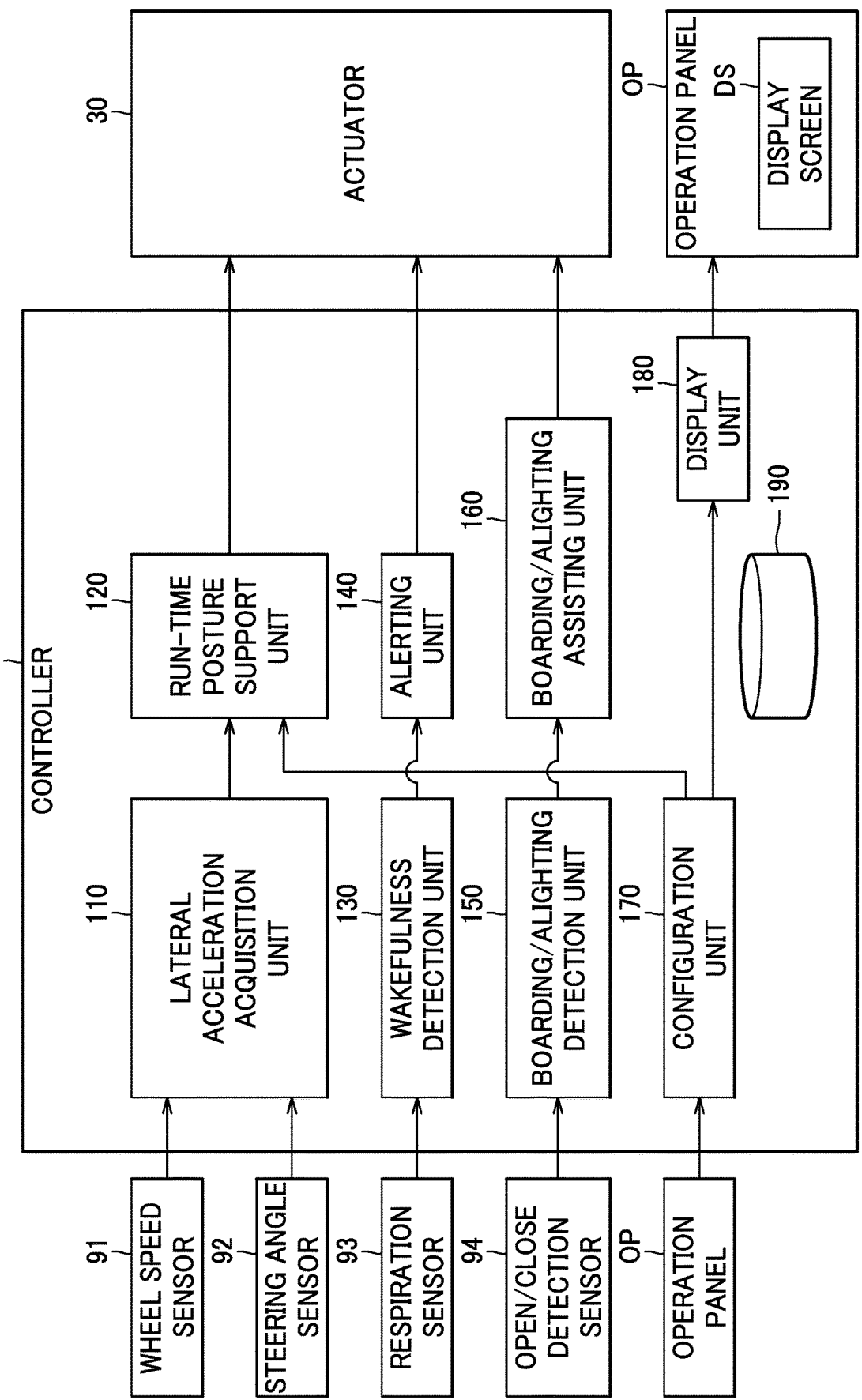
FIG. 6 is a block diagram of a controller according to an exemplified embodiment.

As shown in FIG. 6, the car seat S further includes a wheel speed sensor 91 configured to detect a wheel speed of each wheel W, a steering angle sensor 92 configured to detect a steering angle of a steering wheel SW, a respiration sensor 93 for use in detection of a condition of wakefulness of a driver, an open/close detection sensor 94 configured to detect opening and closing of each door DR, and a controller 100 configured to exercise control over the actuators 30.

The respiration sensor 93 is a sensor of a resistive pressure-sensitive type having a circular detection surface, and is provided between padding and covering of the seat cushion SC of the driver's seat S1 (see FIG. 2(a)). The respiration sensor 93 is configured to deform downwardly in accordance with the magnitude of pressure applied from above and cause the contact resistance to increase whereby electric resistance between electrodes is decreased. The respiration sensor 93 outputs an electric signal on values of this electric resistance for use in the controller 100.

The controller 100 is configured to exercise control over left and right actuators 30 provided on each seat S1, S21, S22, S23, individually. The controller 100 includes a lateral acceleration acquisition unit 110, a run-time posture support unit 120, a wakefulness detection unit 130, an alerting unit 140, a boarding/alighting detection unit 150, a boarding/alighting assisting unit 160, a configuration unit 170, a display unit 180, and a memory unit 190. The controller 100 comprises components, not shown, such as a CPU (Central Processing Unit), a ROM (Read Only Memory), a RAM (Random Access Memory), and the like, and is configured to implement each of the aforementioned units by loading and executing programs or the like prestored in the memory unit 190.

The lateral acceleration acquisition unit 110 is a unit configured to acquire a lateral acceleration exerted on the car C. In the present embodiment, the lateral acceleration acquisition unit 110 works out a lateral acceleration GC by computation based on a wheel speed acquired from the wheel speed sensor 91 and a steering angle acquired from the steering angle sensor 92. To be more specific, the lateral acceleration GC may be computed using a vehicle speed V determined from a wheel speed by a known method, and a stability factor A as a car-specific constant, a wheel base L of the car C, a steering angle $\varphi$, and a turning radius R, by the following equation:

$$R=(1+AV^2)/(L/\varphi)$$

$$GC=V^2/R$$

Hereupon, the lateral acceleration GC in the present embodiment is assumed such that the value of acceleration in the right direction is expressed by a positive number and the value of acceleration in the left direction is expressed by a negative number.

The run-time posture support unit 120 is a unit configured to execute a run-time posture support control under which when a vehicle C makes a turn, the actuators 30 are regulated to cause the rest surface of the seat back SB to be oriented in a direction of the turn. To be more specific, the run-time posture support unit 120 causes the actuators 30 to actuate the side portion frames 22, 23 based upon the lateral acceleration GC acquired by the lateral acceleration acquisition unit 110, and turn the side portion frames 22, 23 to thereby change the orientation of the rest surface of the seat back SB.

More specifically, the run-time posture support unit 120 starts a run-time posture support control if a magnitude (absolute value) of the lateral acceleration GC becomes equal to or greater than a first acceleration threshold value GCth1, and causes the actuator 30 for example for the driver's seat S1 to rotate in the normal direction thereby turning the side portion frame 22, 23 from the normal position to the first forward position (1) as shown in FIG. 7, and pushing the seat side portion 12, 13 forward, so that the rest surface of the seat back SB is oriented in the direction of the turn. Furthermore, if the magnitude of the lateral acceleration GC becomes equal to or greater than a second acceleration threshold value GCth2 that is greater than the first acceleration threshold value GCth1, the run-time posture support unit 120 causes the actuator 30 for the driver's seat S1 to further rotate in the normal direction thereby turning the side portion frame 22, 23 to the second forward position (2), and further pushing the seat side portion 12, 13 forward, so that the rest surface of the seat back SB is oriented further in the direction of the turn.

In this way, the run-time posture support unit 120 is configured such that the amount of change in orientation of the rest surface of the seat back SB (in the present embodiment, the amount of turn of the side portion frame 22, 23) is set to be greater if the magnitude of lateral acceleration GC is greater than if the magnitude of the lateral acceleration GC is smaller. It is to be understood that the magnitude of lateral acceleration GC becomes greater if the turn made is sharp or the vehicle speed is high, and becomes smaller if the turn made is gentle or the vehicle speed is low.

The run-time posture support unit 120 is configured such that if the magnitude of lateral acceleration GC becomes smaller than a second reset threshold value Rth2 during execution of the run-time posture support control, the actuator 30 is caused to rotate in the reverse direction and turn the side portion frame 22, 23 backward to a previous position taken up before the magnitude of lateral acceleration GC becomes the second acceleration threshold value GCth2 or greater, thereby slightly restoring the orientation of the rest surface of the seat back SB. The second reset threshold value Rth2 is preset at a value smaller than the second acceleration threshold value GCth2 and greater than the first acceleration threshold value GCth1. Furthermore, the run-time posture support unit 120 is configured such that if the magnitude of lateral acceleration GC becomes smaller than a first reset threshold value Rth1, the actuator 30 is caused to further rotate in the reverse direction, to thereby turn the side portion frame 22, 23 backward to the normal position, so that the orientation of the rest surface of the seat back SB is restored to bring the run-time posture support control to an end. The first reset threshold value Rth1 is set at a value smaller than the first acceleration threshold value GCth1.

Each of the threshold values are predetermined by making a test run, simulation, or the like. Each of GCth1, GCth2, Rth1 and Rth2 is set to be a positive value. In the present embodiment, a lateral acceleration directed to the left as generated during a right turn is assumed to be a negative value; therefore, during a right turn, for example, if GC≤–GCth1, then it is determined that the magnitude of lateral acceleration GC is equal to or greater than the first acceleration threshold value GCth1, and if GC>–Rth1, then it is determined that the magnitude of lateral acceleration GC is smaller than the first reset threshold value Rth1.

The run-time posture support unit 120 is configured to individually regulate the actuators 30 of the respective seats S1, S21, S22, S23 in accordance with placements of the seats S1, S21, S22, S23 in the car C, when the run-time posture support control is executed. To be more specific, the run-time posture support unit 120 is configured to set amounts of turn of the side portion frames 22, 23 for the second seats S2 to be greater than an amount of turn of the side portion frame 22, 23 for the driver's seat S1 when the run-time posture support control is executed. Furthermore, the run-time posture support unit 120 is configured to set amounts of turn of the side portion frames 22, 23 for the rear seats S22, S23 to be greater than an amount of turn of the side portion frame 22, 23 for the passenger seat S21 when the run-time posture support control is executed.

To elaborate, as shown in FIG. 7, the run-time posture support unit 120 is configured such that if the magnitude of lateral acceleration GC becomes equal to or greater than the first acceleration threshold value GCth1, the side portion frame 22, 23 for the passenger seat S21 is actuated, with an amount of turn therefor being increased in an increment of 0.5 from the amount of turn (1) for the driver's seat S1, and is thus turned from the normal position to a middle position (1.5) between the first forward position and the second forward position. The run-time posture support unit 120 is also configured such that if the magnitude of lateral acceleration GC becomes equal to or greater than the second acceleration threshold value GCth2, the side portion frame 22, 23 for the passenger seat S21 is actuated, with an amount of turn therefor being increased in an increment of 0.5 from the amount of turn (2) for the driver's seat S1, and is thus turned to a middle position (2.5) between the second forward position and the third forward position.

The run-time posture support unit 120 is configured such that if the magnitude of lateral acceleration GC becomes equal to or greater than the first acceleration threshold value GCth1, the side portion frame 22, 23 for the rear seat S22, S23 is actuated, with an amount of turn therefor being so increased in an increment of 1 from the amount of turn (1) for the driver's seat S1 as to be greater than the amount of turn (1.5) for the passenger seat S21, and is thus turned from the normal position to the second forward position (2). The run-time posture support unit 120 is also configured such that if the magnitude of lateral acceleration GC becomes equal to or greater than the second acceleration threshold value GCth2, the side portion frame 22, 23 for the rear seat S22, S23 is actuated, with an amount of turn therefor being so increased in an increment of 1 from the amount of turn (2) for the driver's seat S1 as to be greater than the amount of turn (2.5) for the passenger seat S21, and is thus turned to the third forward position (3).

Hereinafter, a middle position between the normal position (0) and the first forward position (1) will be referred to as first middle position (0.5); a middle position between the first forward position (1) and the second forward position (2) will be referred to as second middle position (1.5); a middle position between the second forward position (2) and the third forward position (3) will be referred to as third middle position (2.5); a middle position between the third forward position (3) and the fourth forward position (4) will be referred to as fourth middle position (3.5); and a middle position between the fourth forward position (4) and the fifth forward position (5) will be referred to as fifth middle position (4.5).

Furthermore, the run-time posture support unit 120 is configured such that the amount of turn of the side portion frame 22, 23 set when a run-time posture support control is executed is greater in an autonomous driving mode than in a manual driving mode.

To elaborate, as shown in FIG. 7, the run-time posture support unit 120 is configured such that if the magnitude of lateral acceleration GC becomes equal to or greater than the first acceleration threshold value GCth1, the side portion frame 22, 23 for the driver's seat S1 is actuated in an autonomous driving mode, with an amount of turn being increased in an increment of 1 from the amount of turn (1) to be set in a manual driving mode, and is thus turned from the normal position to the second forward position (2). The run-time posture support unit 120 is also configured such that if the magnitude of lateral acceleration GC becomes equal to or greater than the second acceleration threshold value GCth2, the side portion frame 22, 23 for the driver's seat S1 is actuated in the autonomous driving mode, with an amount of turn being increased in an increment of 1 from the amount of turn (2) to be set in the manual driving mode, and is thus turned to the third forward position (3).

The run-time posture support unit 120 is configured such that if the magnitude of lateral acceleration GC becomes equal to or greater than the first acceleration threshold value GCth1, the side portion frame 22, 23 for the passenger seat S21 is actuated in the autonomous driving mode, with an amount of turn therefor being increased in an increment of 0.5 from the amount of turn (2) for the driver's seat S1 to be set in the autonomous driving mode, and is thus turned from the normal position to the third middle position (2.5). The run-time posture support unit 120 is also configured such that if the magnitude of lateral acceleration GC becomes equal to or greater than the second acceleration threshold value GCth2, the side portion frame 22, 23 for the passenger seat S21 is actuated, with an amount of turn therefor being increased in an increment of 0.5 from the amount of turn (3) for the driver's seat S1 to be set in the autonomous driving mode, and is thus turned to the fourth middle position (3.5).

The run-time posture support unit 120 is configured such that if the magnitude of lateral acceleration GC becomes equal to or greater than the first acceleration threshold value GCth1, the side portion frame 22, 23 for the rear seat S22, S23 is actuated in the autonomous driving mode, with an amount of turn therefor being increased in an increment of 1 from the amount of turn (2) for the driver's seat S1 to be set in the autonomous driving mode, and is thus turned from the normal position to the third forward position (3). The run-time posture support unit 120 is also configured such that if the magnitude of lateral acceleration GC becomes equal to or greater than the second acceleration threshold value GCth2, the side portion frame 22, 23 for the rear seat S22, S23 is actuated in the autonomous driving mode, with an amount of turn therefor being increased in an increment of 1 from the amount of turn (3) for the driver's seat S1 to be set in the autonomous driving mode, and is thus turned to the fourth forward position (4).

It is to be understood that the run-time posture support unit 120 may also be configured such that when the run-time posture support control is executed, the actuator 30 is regulated at a lower speed in the autonomous driving mode than in the manual driving mode. With this alternative configuration, abrupt activation of the seat side portion 12, 13 can be avoided, so that discomfort or the like which an occupant would experience may be suppressed.

The wakefulness detection unit 130 is a unit configured to obtain a signal from the respiration sensor 93 and to detect a condition of wakefulness of a driver based on this signal from the respiration sensor 93. For example, the wakefulness detection unit 130 may make a determination about a condition of wakefulness of a driver from the waveforms derived from the respiration sensor 93, as described in JP 2015-80521 A. The wakefulness detection unit 130 is configured such that if it is determined that a value as an indicator of wakefulness passes a predetermined threshold value of wakefulness and thus a condition of wakefulness of the driver is worsened below a specified criterion, then a signal to that effect is provided for use in the alerting unit 140.

The alerting unit 140 is a unit configured to execute an alert control under which when the wakefulness detection unit 130 detects worsening of the condition of wakefulness of the driver, the actuator 30 for the driver's seat S1 is regulated to change an orientation of the rest surface of the seat back SB. To be more specific, when worsening of the condition of wakefulness of the driver is detected by the wakefulness detection unit 130, the alerting unit 140 starts the alert control, and causes the left and right actuators 30 for the driver's seat S1 to rotate in normal and reverse directions alternately, thereby causing the side portion frames 22, 23 to be turned forward and backward alternately, so that the orientation of the rest surface of the seat back SB is changed to the left and to the right, alternately.

To elaborate, the alerting unit 140, first, causes the right actuator 30 to rotate in the normal direction and turn the side portion frame 22 forward from the normal position to the fifth forward position (5), to push the seat side portion 12 forward, thereby orienting the rest surface of the seat back SB to the left, then causes the right actuator 30 to rotate in the reverse direction and turn the side portion frame 22 back from the fifth forward position (5) to the normal position, thereby restoring the orientation of the rest surface of the seat back SB. Next, the alerting unit 140 causes the left actuator 30 to rotate in the normal direction and turn the side portion frame 23 forward from the normal position to the fifth forward position (5), to push the seat side portion 13 forward, thereby orienting the rest surface of the seat back SB to the right, then, causes the left actuator 30 to rotate in the reverse direction and turn the side portion frame 23 back from the fifth forward position (5) to the normal position, thereby restoring the orientation of the rest surface of the seat back SB. The alerting unit 140 is configured to repeat this sequence of operations in the process of alert control. In this way, the alerting unit 140 shakes the upper body of the driver into wakefulness.

In the present embodiment, the amount of turn of the side portion frame 22, 23 set when the alert control is executed is greater than the amount of turn of the side portion frame 22, 23 set when the alert control is not executed. To be specific, the amount of turn of the side portion frame 22, 23 set when the alert control is executed is greater than the amount of turn of the side portion frame 22, 23 set when the run-time posture support control is executed in the car C. To be more specific, as shown in FIG. 7, the amount of turn (5) of the side portion frame 22, 23 set when the alert control is executed is greater than the amount of turn (3 at the maximum) of the side portion frame 22, 23 set if when the run-time posture control is executed in the car C in the autonomous driving mode.

It is to be understood that the alerting unit 140 may be configured to regulate the actuator 30 at a higher speed when the alerting unit 140 executes an alert control than when the run-time posture support unit 120 executes a run-time posture support control. For example, assuming that the run-time posture support unit 120 is configured to regulate the actuator 30 at a speed of 80% of the maximum speed capacity of the actuator 30, the alerting unit 140 may be configured to regulate the actuator 30 at a speed of 100% of the maximum speed capacity of the actuator 30.

The boarding/alighting detection unit 150 is a unit configured to detect an indication of boarding into and alighting from the car C, of a passenger. In the present embodiment, the boarding/alighting detection unit 150 is configured to obtain a signal from the open/close detection sensor 94 detecting opening and closing of each door DR and to determine that a boarding or alighting event is taking place upon detection of opening of the door DR based on the signal from the open/close detection sensor 94. The boarding/closing detection unit 150 is configured such that if it is determined that a boarding or alighting event is taking place, a signal to that effect is provided for use in the boarding/alighting assisting unit 160.

The boarding/alighting assisting unit 160 is a unit configured to execute a boarding/alighting assisting control under which the actuator 30 closer to the doorway of the seat S1, S21, S22, S23 is regulated to orient the rest surface of the seat back SB toward the doorway of the car C, if the boarding/alighting detection unit 150 detects boarding into and/or alighting from the car C, of a passenger.

To be more specific, when opening of a door DR is detected by the boarding/alighting detection unit 150, the boarding/alighting assisting unit 160 causes the relevant actuator 30 (closer to the doorway DE) of the car seat S corresponding to the opened door DR to rotate in the reverse direction and turn the side portion frame 22, 23 from the normal position to the backward position, thereby orienting the rest surface of the seat back SB toward the doorway DE, as shown in FIG. 5. When closing of a door DR is detected by the boarding/alighting detection unit 150, the boarding/alighting assisting unit 160 causes the relevant actuator 30 (closer to the doorway DE) of the car seat S corresponding to the closed door DR to rotate in the normal direction and turn the side portion frame 22, 23 from the backward position to the normal position, thereby restoring the orientation of the rest surface of the seat back SB.

In the present embodiment, the amount of turn of the side portion frame 22, 23 from the normal position to the backward position set when the boarding/alighting assisting control is executed is greater than the amount of turn of the side portion frame 22, 23 from the normal position to the fifth forward position set when the alert control is executed. Accordingly, the amount of change in orientation of the rest surface of the seat back SB set when the boarding/alighting assisting control is executed is greater than the amount of change in orientation of the rest surface of the seat back SB set when the alert control is executed.

The configuration unit 170 is a unit through which the amount of change in orientation of the rest surface of the seat back SB is set based upon information inputted manually by an occupant, and is configured to permit the amount of change in orientation of the rest surface to be set at any value selected among amounts of change including zero. To be more specific, the configuration unit 170 is configured such that the amount of turn of the side portion frame 22, 23 can be set for each of the seats S1, S21, S22, S23, based upon information inputted by an occupant operating the operation panel OP. The amount of turn of the side portion frame 22, 23 may be set as an amount of turn from the normal position to any position between the normal position and the fifth forward position (5).

In the present embodiment, if the configuration unit 170 has set the amount of turn of the side portion frame 22, 23 (the amount of change in orientation of the rest surface of the seat back SB), the run-time posture support unit 120 regulates the actuator 30 in accordance with the amount of turn set by the configuration unit 170. That is, the run-time posture support unit 120 is configured such that if the configuration unit 170 has set the amount of turn of the side portion frame 22, 23, the set amount of turn is given a higher priority, and used to regulate the actuator 30.

For example, if the configuration unit 170 has set the amount of turn of the side portion frame 22, 23 at 0, the run-time posture support unit 120 does not cause the side portion frame 22, 23 to be turned (i.e., does not cause the actuator 30 to operate) but rather retains the side portion frame 22, 23 in the normal position, even when the magnitude of lateral acceleration GC becomes equal to or greater than the first acceleration threshold value GCth1. The run-time posture support unit 120 also does not cause the actuator 30 to operate and retains the side portion frame 22, 23 in the normal position, even when the magnitude of lateral acceleration GC becomes equal to or greater than the second acceleration threshold value GCth2. In other words, if the configuration unit 170 has set the amount of turn at 0, the run-time posture support unit 120 does not execute the run-time posture support control (the unit is turned off).

Moreover, for example, if the configuration unit 170 has set the amount of turn of the side portion frame 22, 23 for the driver's seat S1 to be an amount corresponding to the third forward position (3), then when the magnitude of lateral acceleration GC becomes equal to or greater than the first acceleration threshold value GCth1, the run-time posture support unit 120 causes the side portion frame 22, 23 to be turned by the amount of turn (3) set by the configuration unit 170, rather than the normal amount of turn (1) as shown in FIG. 7, so as to be turned from the normal position to the third forward position. The run-time posture support unit 120 also does not cause the side portion frame 22, 23 to be turned but rather retained in the third forward position, when the magnitude of lateral acceleration GC becomes equal to or greater than the second acceleration threshold value GCth2.

The configuration unit 170 may be configured to be able to set amounts of change in orientation of the rest surface, individually, such that one amount of change in orientation may be set when the magnitude of lateral acceleration GC is equal to or greater than the first acceleration threshold value GCth1, and another amount of change in orientation may be set when the magnitude of lateral acceleration GC is equal to or greater than the second acceleration threshold value GCth2. The alerting unit 140 and/or the boarding/alighting assisting unit 160 may be configured such that if the configuration unit 170 has settings to the effect that the execution of the alert control and/or the boarding/alighting assisting control has been prohibited by the operation of an occupant, then the relevant control(s) are not executed by any means (the unit(s) is turned off).

The display unit 180 is a unit configured to cause a display screen DS of the operation panel OP as a display device to display thereon information currently set about the amounts of change in orientation of the rest surface of the seat back SB. To be more specific, if the configuration unit 170 has set an amount of change in orientation of the rest surface, the display unit 180 causes the display screen DS of the operation panel OP to display the amount of change in orientation set by the configuration unit 170. It is to be understood that if the configuration unit 170 has not set any amount of change in orientation of the rest surface, then the display unit 180 may, but not necessarily, cause the display screen DS of the operation panel OP to display the set value for the run-time posture support control, or alternatively, may cause the display screen DS of the operation panel OP to display a message to the effect that the run-time posture support control is being executed (the run-time posture support unit has been turned on), rather than to display the set values.

The memory unit 190 is a device configured to store values obtained from the sensors 91-94, values resulting from computations performed by the respective units, threshold values, set values, and the like.

The next discussion is directed to operations of the car seat S configured as described above.

When the car C makes a turn at a curve or at an intersection, the car C undergoes a lateral acceleration GC. If the magnitude of lateral acceleration GC becomes equal to or greater than the first acceleration threshold value GCth1, then the run-time posture support unit 120 executes a run-time posture support control under which the rest surface of the seat back SB of each seat S1, S21, S22, S23 is oriented in a direction of the turn.

Figure 8:
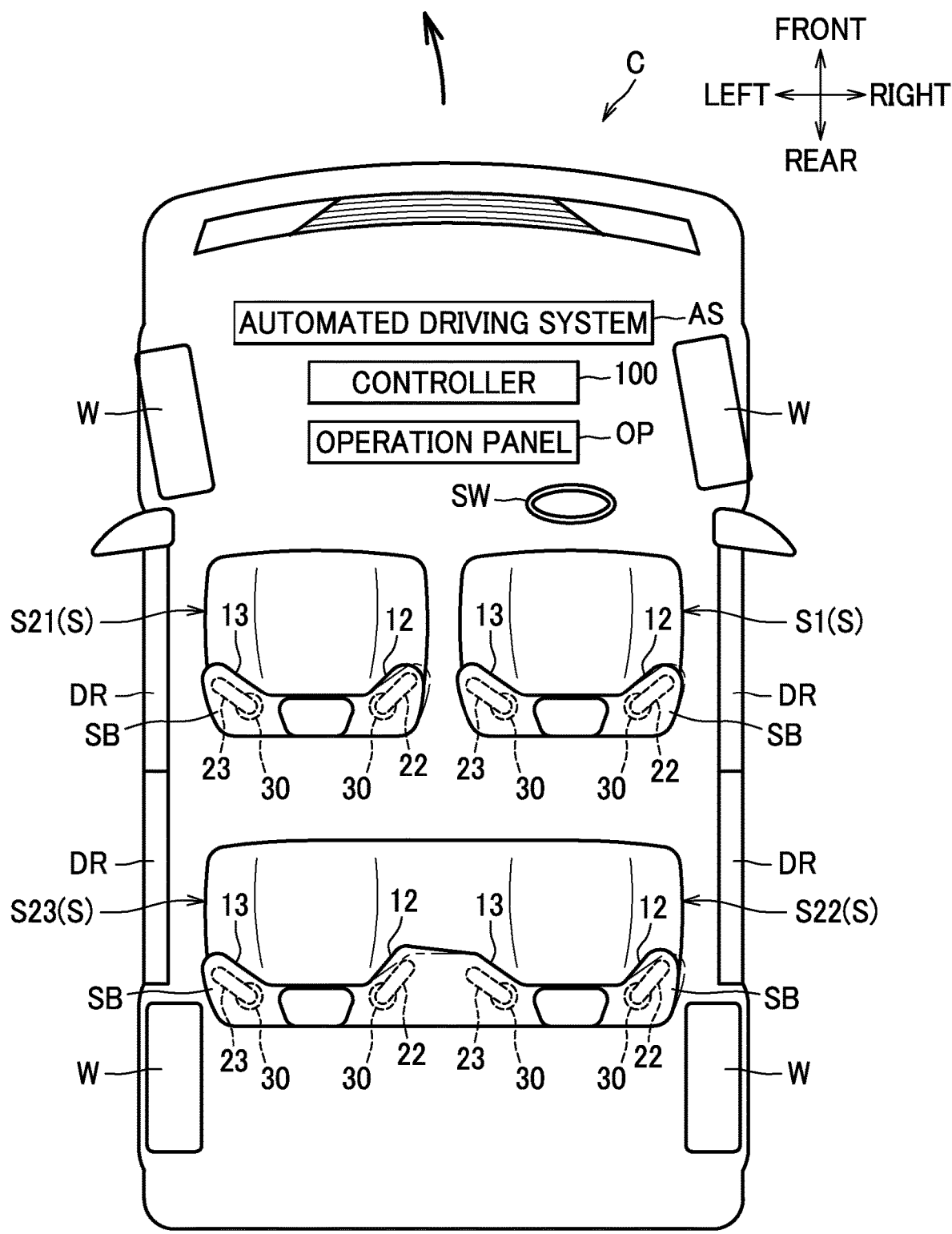
FIG. 8 is a diagram for explaining operations under the run-time posture support control.

To be more specific, during a left turn, as shown in FIG. 8, the right actuators 30 are caused to rotate in the normal direction to turn the side portion frames 22 from the normal position to the first forward position (1) for the driver's seat S1, to the second middle position (1.5) for the passenger seat S21, and to the second forward position (2) for the rear seats S22, S23, to push the seat side portions 12 forward, thereby orienting the rest surfaces of the seat backs SB to the left. On the other hand, during a right turn, the left actuators 30 are caused to rotate in the normal direction to turn the side portion frames 23 from the normal position to the first forward position (1), to the second middle position (1.5), or to the second forward position (2), to push the seat side portions 13 forward, thereby orienting the rest surfaces of the seat backs SB to the right.

Figure 9:
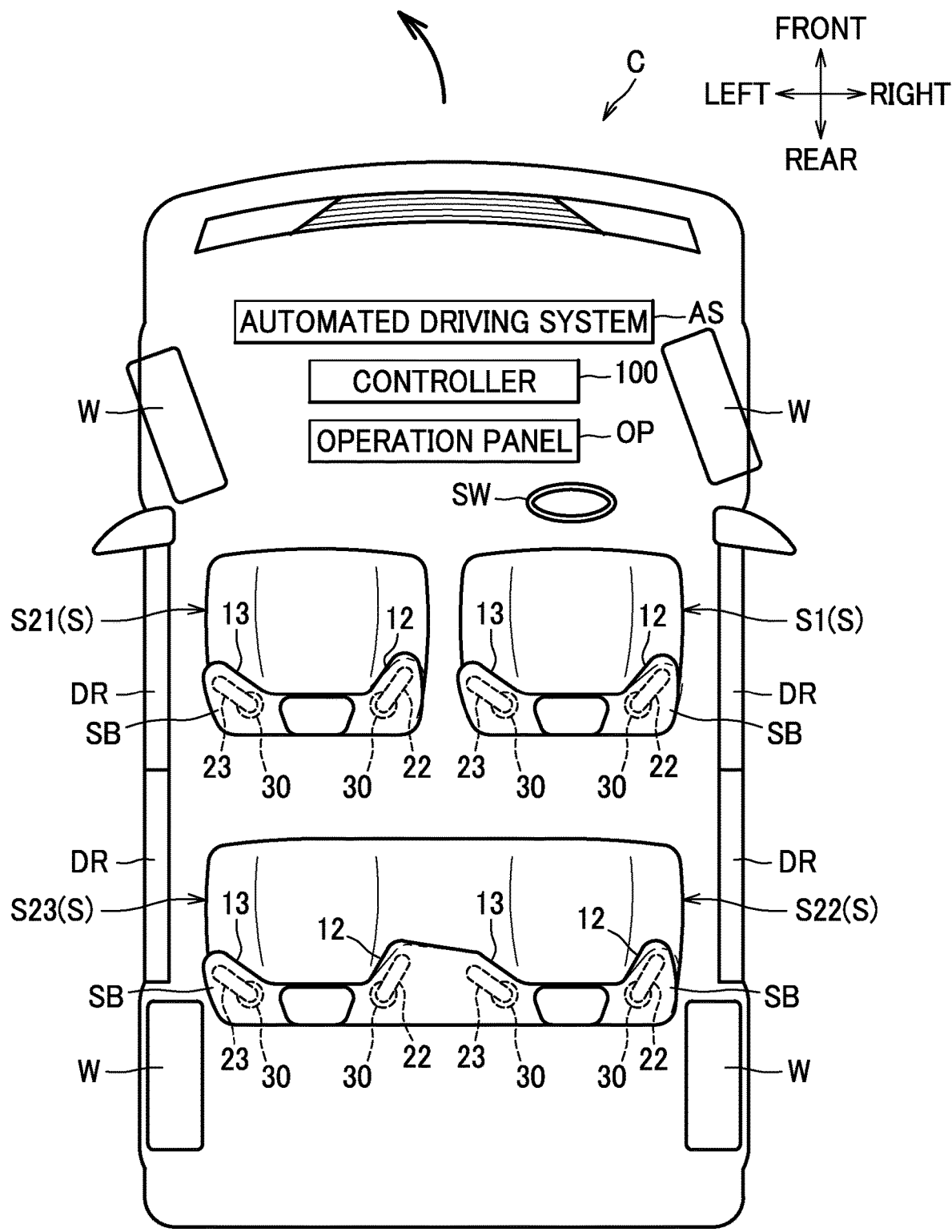
FIG. 9 is a diagram for explaining operations under the run-time posture support control.

If the turn made is sharp or the vehicle speed is high, the magnitude of lateral acceleration GC becomes equal to or greater than the second acceleration threshold value GCth2. In this situation, the run-time posture support unit 120, during the left turn, as shown in FIG. 9, causes the right actuators 30 to further rotate in the normal direction and turn the side portion frames 22 to the second forward position (2) for the driver's seat S1, to the third middle position (2.5) for the passenger seat S21, and to the third forward position (3) for the rear seats S22, S23, to further push the seat side portions 12 forward, thereby orienting the rest surfaces of the seat backs SB further to the left. On the other hand, during the right turn, the left actuators 30 are caused to further rotate in the normal direction to turn the side portion frames 23 to the second forward position (2), to the third middle position (2.5), or to the third forward position (3), to further push the seat side portions 13 forward, thereby orienting the rest surfaces of the seat backs SB further to the right.

With this configuration, the upper body of the occupant can be received effectively by the rest surface of each seat back SB. Furthermore, for the driver's seat S1, the left or right end portion of the seat back SB corresponding to the side opposite to the side toward which the turn is being made is pushed forward so that the distance between the steering wheel SW and the seat back SB can be reduced; accordingly, the steering operation can be made easier.

Thereafter, if the turn becomes not so sharp, or the vehicle speed becomes low, and the magnitude of lateral acceleration GC becomes equal to or smaller than the second reset threshold value Rth2, the run-time posture support unit 120 causes the actuators 30 to rotate in the reverse direction and turn the side portion frames 22, 23 backward to the first forward position (1), the second middle position (1.5) or the second forward position (2), to slightly turn back the orientation of the rest surfaces of the seat backs SB (see FIG. 8). When the turn has been made to an end, and the magnitude of lateral acceleration GC becomes smaller than the first reset threshold value Rth1, the run-time posture support unit 120 causes the actuators 30 to further rotate in the reverse direction and turn the side portion frames 22, 23 back to the normal position, thereby restoring the orientation of the rest surfaces of the seat backs SB (see FIG. 1).

On the other hand, while the condition of wakefulness of the driver worsens, for example, during driving on a straight roadway or on a gently curved roadway, the wakefulness detection unit 130 computes a value indicative of the wakefulness based on a signal obtained from the respiration sensor 93. If the value indicative of wakefulness condition meets a predetermined condition with reference to a set wakefulness threshold value and indicates that the condition of wakefulness of the driver worsens and falls below a predetermined level, then the wakefulness detection unit provides a signal to that effect for use in the alerting unit 140. The alerting unit 140, responsive to the signal received, executes an alert control under which the orientation of the rest surface of the seat back SB of the driver's seat S1 is changed.

Figure 10:
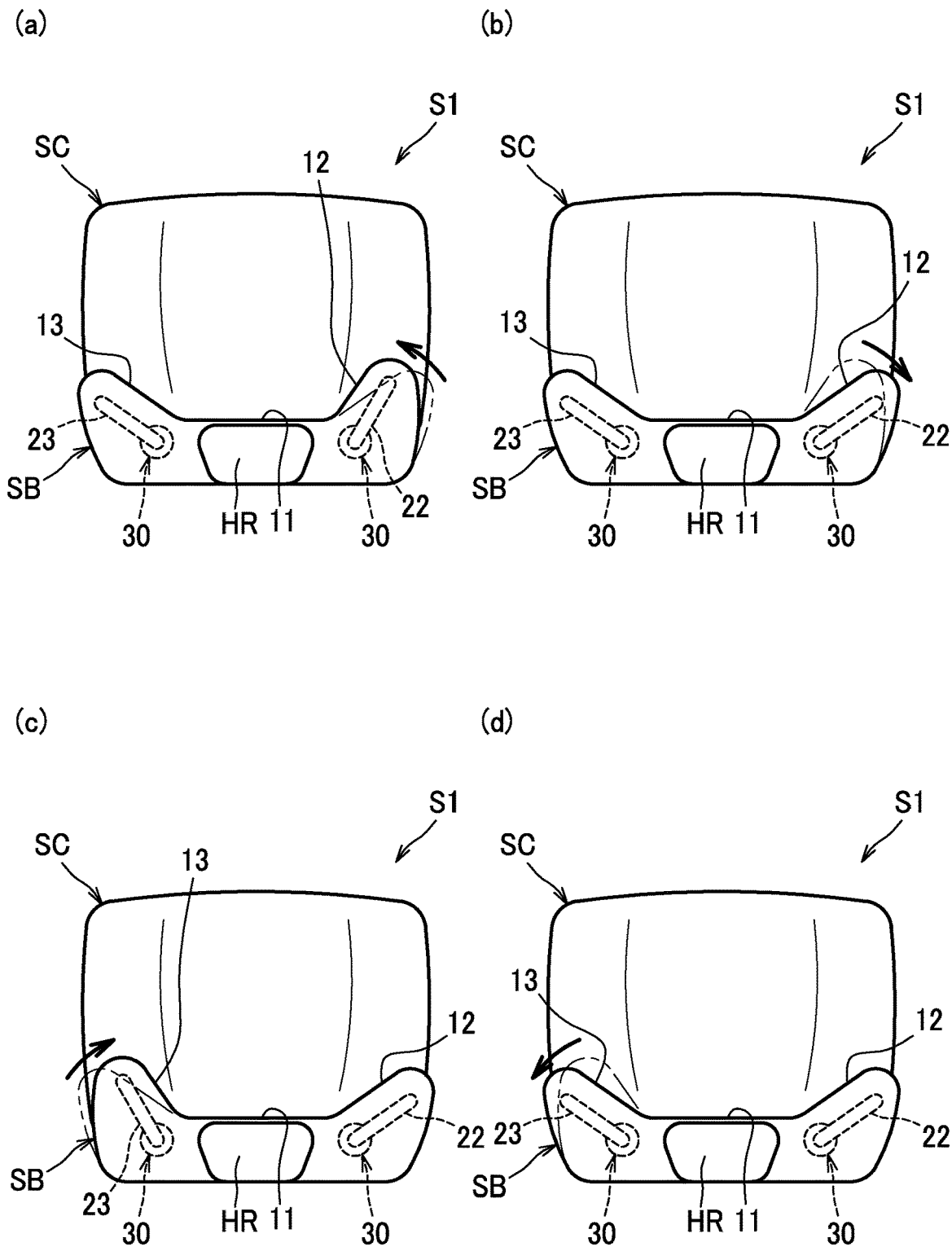
FIG. 10 includes views (a) to (d) for explaining operations under the alert control.

To be more specific, a series of motions shown in FIGS. 10(a)-(d) are repeated. As shown in FIG. 10(a), first, the right actuator 30 is caused to rotate in the normal direction and turn the side portion frame 22 from the normal position forward to the fifth forward position (5), to push the seat side portion 12 forward, thereby orienting the rest surface of the seat back SB to the left. Thereafter, as shown in FIG. 10(b), the right actuator 30 is caused to rotate in the reverse direction to thereby restore the orientation of the rest surface of the seat back SB. Next, as shown in FIG. 10(c), the left actuator 30 is caused to rotate in the normal direction and turn the side portion frame 23 from the normal position forward to the fifth forward position (5), to push the seat side portion 13 forward, thereby orienting the rest surface of the seat back SB to the right. Thereafter, as shown in FIG. 10(d), the left actuator 30 is caused to rotate in the reverse direction to thereby restore the orientation of the rest surface of the seat back SB. By repeating this series of motions, the upper body of the driver can be shaken laterally to a large extent, and the driver can thus be awakened.

It is presumably when a driver makes a turn that the run-time posture support unit 120 executes a run-time posture support control; in such situations, the probability of worsening of the condition of wakefulness of the driver is low. Therefore, the run-time posture support control executed by the run-time posture support unit 120 and the alert control executed by the alerting unit 140 would hardly interfere. It is preferable that if the condition for activating the run-time posture support control and the condition for activating the alert control are both met, either of the controls given higher priority (e.g., run-time posture support control) is executed.

When the car C stops, and the boarding/alighting detection unit 150 detects opening of a door DR, the boarding/alighting assisting unit 160 executes a boarding/alighting assisting control under which the rest surface of the seat back SB of the corresponding seat S1, S21, S22, S23 is oriented toward the doorway DE of the car C. To be more specific, for example, when the door DR at the driver's seat is opened, as shown in FIG. 5, the boarding/alighting assisting unit 160 causes the right actuator 30 to rotate in the reverse direction, to turn the side portion frame 22 from the normal position to the backward position, thereby orienting the rest surface of the seat back SB toward the doorway DE. Thereafter, when the door DR at the driver's seat S1 is closed, the boarding/alighting assisting unit 160 causes the right actuator 30 to rotate in the normal direction, to turn the side portion frame 22 from the backward position to the normal position, thereby restoring the orientation of the rest surface of the seat back SB.

In the present embodiment as described above, the orientation of the rest surface of the seat back SB can be changed properly in accordance with a situation experienced by an occupant, specifically, in accordance with a placement of the seat S1, S21, S22, S23 in the car C. Accordingly, the occupant can be supported properly by the rest surface of the seat back SB in accordance with the situation experienced by the occupant when the car C makes a turn.

An occupant seated on the second seat S2 himself/herself does not drive, and thus would not be able to assume a posture in accordance with the direction of turn; nevertheless, the occupant seated on the second seat S2 can be properly received by the rest surface of the seat back SB when the car C makes a turn, because the amount of change in orientation of the rest surface of the seat back SB of the second seat S2 is set to be greater than that of the driver's seat S1. Accordingly, the comfort can be improved.

Furthermore, the occupant who is seated on the rear seat S22, S23 and thus would have a forward visibility poorer than that which occupants seated on the passenger seat would have can be received properly by the rest surface of the seat back SB, because the amount of change in orientation of the rest surface of the rear seat S22, S23 is set to be greater than the amount of change in orientation of the rest surface of the passenger seat S21. Accordingly, the comfort can be improved.

Furthermore, the orientation of the rest surface of the seat back SB can be changed in accordance with a situation experienced by the occupant, specifically, in accordance with the driving mode of the car C, because the amount of change in orientation of the rest surface of the seat back SB is set to be greater in the autonomous driving mode than in the manual driving mode. Moreover, although an occupant himself/herself does not do the steering in the autonomous driving mode and thus would possibly fail to assume an appropriate posture sufficiently responsive to the direction of a turn, the occupant can be received satisfactorily by the rest surface of the seat back SB when the car C makes a turn because the amount of change in orientation of the rest surface of the seat back SB is greater in the autonomous driving mode than in the manual driving mode. Accordingly, the comfort can be improved.

Furthermore, the orientation of the rest surface of the seat back SB can be changed in accordance with a situation experienced by the occupant, specifically, in accordance with the situation of boarding into and/or alighting from the car C, because the rest surface of the seat back SB is oriented toward the doorway DE if any passenger's boarding into and/or alighting from the car C is detected. Moreover, when the boarding/alighting control is executed, the rest surface of the seat back SB can be turned to a large extent toward the doorway DE of the car C, so that the boarding and/or alighting to get seated on or leave the car seat C can be done with increased case. In this way, the increased case in boarding and alighting can be ensured. Moreover, if the open/close detection sensor 94 is configured such that a signal indicating that the door DR is open is provided even when the door DR is in a so-called "half-closed" state (manipulated into a closed state but in actuality not completely closed), the rest surface of the seat back SB is oriented toward the doorway DE even when the door DR is in such a "half-closed" state, and the occupant can be notified of the situation that the door DR is "half-closed".

Furthermore, the orientation of the rest surface of the seat back SB can be changed appropriately in accordance with a situation experienced by an occupant, specifically, in accordance with the condition of wakefulness of the driver, because the amount of change in orientation of the rest surface of the seat back SB of the driver's seat S1 can be set to be greater when worsening of the condition of wakefulness of the driver is detected. Moreover, since the amount of change effected in orientation of the rest surface of the seat back SB of the driver's seat S1 when the alert control is executed can be made greater, the effect of shaking off drowsiness can be increased.

Since the actuator 30 is configured to move the seat side portion 12, 13 by turning its portion (i.e., the side portion frame 22, 23), to thereby change the orientation of the rest surface of the seat back SB, the actuator 30 can be downsized, for example, in comparison with an alternative configuration in which the orientation of the rest surface of the seat back is changed by moving the whole seat.

Since the controller 100 includes the configuration unit 170, and the run-time posture support unit 120 is configured such that the amount of turn of the side portion frame 22, 23 set by the configuration unit 170 is given a higher priority, and used to regulate the actuator 30, the amount of change in orientation of the rest surface of the seat back SB can be set according to the occupant's preference.

Since the configuration unit 170 is configured to permit the amount of change in orientation of the rest surface of the seat back SB to be set at any value selected among amounts of change including zero, the amounts of change in orientation of the rest surface, selectable among values including one which offers the option of not changing the orientation of the rest surface (i.e., not executing the run-time posture support control) can be specified according to occupant's preference.

Since the controller 100 includes the display unit 180, the information on the currently set amount of change in orientation of the rest surface of the seat back SB can be displayed in the display screen DS of the operation panel OP and presented to the occupant Although one illustrative embodiment of the present invention has been described above, the present invention is not limited to the above-described embodiment, and can be changed or modified where appropriate for practicable applications.

For example, the controller may be configured to make a correction to the amount of turn of the side portion frame according to the tilt angle of the seat back or the seat cushion.

To be more specific, in the car seat S as shown in FIG. 11(a) configured such that the lower portion of the seat back SB is pivotally coupled to the rear portion of the seat cushion SC via a reclining mechanism RL to allow the seat back SB to be tilted forward and backward relative to the seat cushion SC, the controller may be configured such that if the tilt angle of the seat back SB is equal to or greater than a backrest angle threshold value (first backrest angle threshold value), then the amount of turn of the side portion frame is increased from the normal amount of turn, for example, by adding 1 thereto. In the car seat S as shown in FIG. 11(b) configured such that the front portion of the seat cushion SC can be moved up and down via a tilt mechanism TL with an adjustable tilt angle of the rest surface of the seat cushion SC, the controller may be configured such that if the tilt angle of the seat cushion SC is equal to or greater than a cushion angle threshold value, then the amount of turn of the side portion frame is increased from the normal amount of turn, for example, by adding 1 thereto. To be more specific, one feasible configuration may be such that if the magnitude of lateral acceleration GC becomes equal to or greater than the first acceleration threshold value GCth1, then the amount of turn of the side portion frame of the driver's seat with its seat back SB and/or seat cushion SC being tilted at a tilt angle equal to or greater than the threshold value is increased from the normal amount of turn (1) (see FIG. 7), for example, by adding 1 thereto, so that the side frame is turned from the normal position to the second forward position (2).

In a state as shown in FIG. 11(c) where the seat back SB has been reclined generally flat relative to the seat cushion SC, specifically, when the tilt angle of the seat back SB has become equal to or greater than a second backrest angle threshold value greater than the aforementioned first backrest angle threshold value, the amount of turn of the side portion frame may be increased from the normal amount of turn, for example, by adding 2 thereto. For example, if the tilt angle of the seat back SB of the passenger seat S21 is equal to or greater than the second backrest angle threshold value, the amount of turn of the side portion frame to be set when the magnitude of lateral acceleration GC becomes equal to or greater than the first acceleration threshold value GCth1 may be increased by adding 2 to the normal amount of turn (1.5) (see FIG. 7), so that the side portion frame is turned from the normal position to the fourth middle position (3.5).

The above embodiment has been described on the premise that the second seat S2 includes the passenger seat S21 and the rear seats S22, S23, but this is not a prerequisite in essence. For example, as shown in FIG. 12, the second seat S2 may include a passenger seat S21, a middle row seat S24 disposed to the rear of the driver's seat S1, a middle row seat S25 disposed to the rear of the passenger seat S21, and a third row seat S26 disposed to the rear of the middle row seat S24, and a third row seat S27 disposed to the rear of the middle row seat S25.

To give an explanation of one example of set values of the amounts of turn of the side portion frames 22, 23 for these seats as used under the run-time posture support control, as shown in FIG. 13, the controller 100 (run-time posture support unit) increases the amount of turn of the side portion frame 22, 23 of the middle row seats S24, S25 by adding 1.5 to the amount of turn (1) set for the driver's seat S1 so that the side portion frame 22, 23 is turned from the normal position to the third middle position (2.5), if the magnitude of lateral acceleration GC becomes equal to or greater than the first acceleration threshold value GCth1. If the magnitude of lateral acceleration GC becomes equal to or greater than the second acceleration threshold value GCth2, the amount of turn of the side portion frame 22, 23 is increased by adding 1.5 to the amount of turn (2) set for the driver's seat S1, so that the side portion frame 22, 23 is turned to the fourth middle position (3.5). If in the autonomous driving mode, addition of 1.5 to the amount of turn (2 or 3) set for the driver's seat S1 in the autonomous driving mode is performed.

The controller 100 increases the amount of turn of the side portion frame 22, 23 of the third row seats S26, S27 by adding 1 to the amount of turn (1) set for the driver's seat S1 so that the side portion frame 22, 23 is turned from the normal position to the second forward position (2), if the magnitude of lateral acceleration GC becomes equal to or greater than the first acceleration threshold value GCth1. If the magnitude of lateral acceleration GC becomes equal to or greater than the second acceleration threshold value GCth2, the amount of turn of the side portion frame 22, 23 is increased by adding 1.5 to the amount of turn (2) for the driver's seat S1, so that the side portion frame 22, 23 is turned to the fourth middle position (3.5). If in the autonomous driving mode, addition of 1.5 to the amount of turn (2 or 3) set for the driver's seat S1 in the autonomous driving mode is performed.

Figure 12:
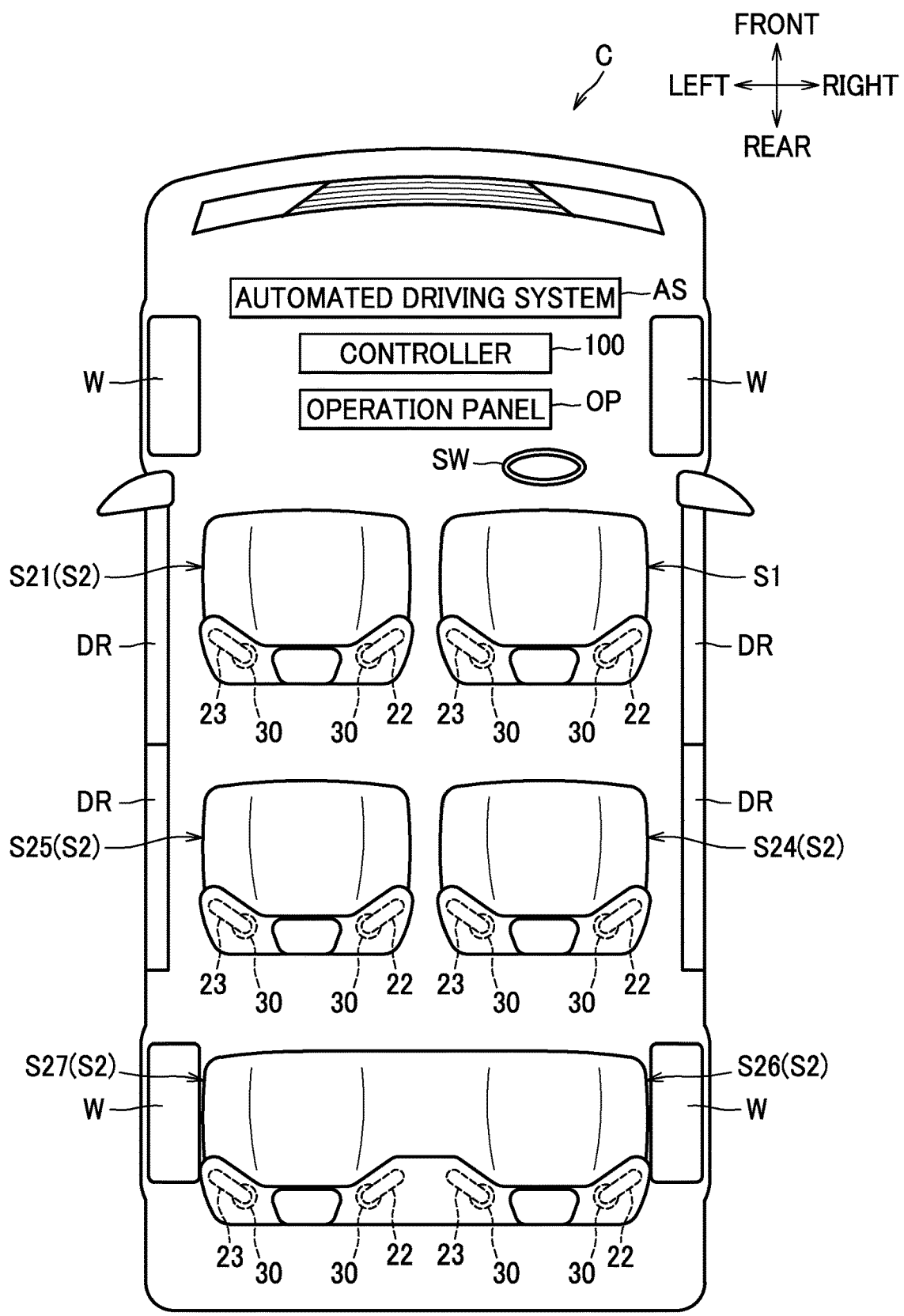
FIG. 12 is a view showing a vehicle in which vehicle seats according to another exemplified embodiment are installed.

In the arrangement shown in FIG. 12, the boarding and alighting for the third row seats S26, S27 take place through the door DR (doorway) provided at laterally outer sides of the middle row seats S24, S25. In other words, no door is provided at laterally outer sides of the third row seats S26, S27. In this construction, the controller 100 (boarding/alighting assisting unit) is configured to execute no boarding/alighting assisting control (see FIG. 5) for the third row seats S26, S27.

The controller 100 further includes an installation detection unit configured to detect whether or not a child seat is installed to the car seat S, and the run-time posture support unit may be configured to increase the amount of turn of the side portion frame 22, 23 set when the run-time posture support control is executed, if the installation detection unit detects that a child seat is installed to the car seat S. To be more specific, in a state as shown in FIG. 14(a) where a child seat S3 is installed in the middle row seat S24, if the magnitude of lateral acceleration GC becomes equal to or greater than the first acceleration threshold value GCth1 during a left turn, the amount of turn of the side portion frame 22 is increased, for example, by adding 1 to the normal amount of turn (2.5) (see FIG. 13), so that the side portion frame 22 is turned from the normal position to the fourth middle position (3.5) as shown in FIG. 14(b). Moreover, the controller 100 may be configured such that if the installation detection unit detects that a child seat S3 is installed to the car seat S, the actuator 30 of the car seat S to which the child seat S3 is installed is not operated (i.e., the orientation of the rest surface is not changed).

Figure 15:
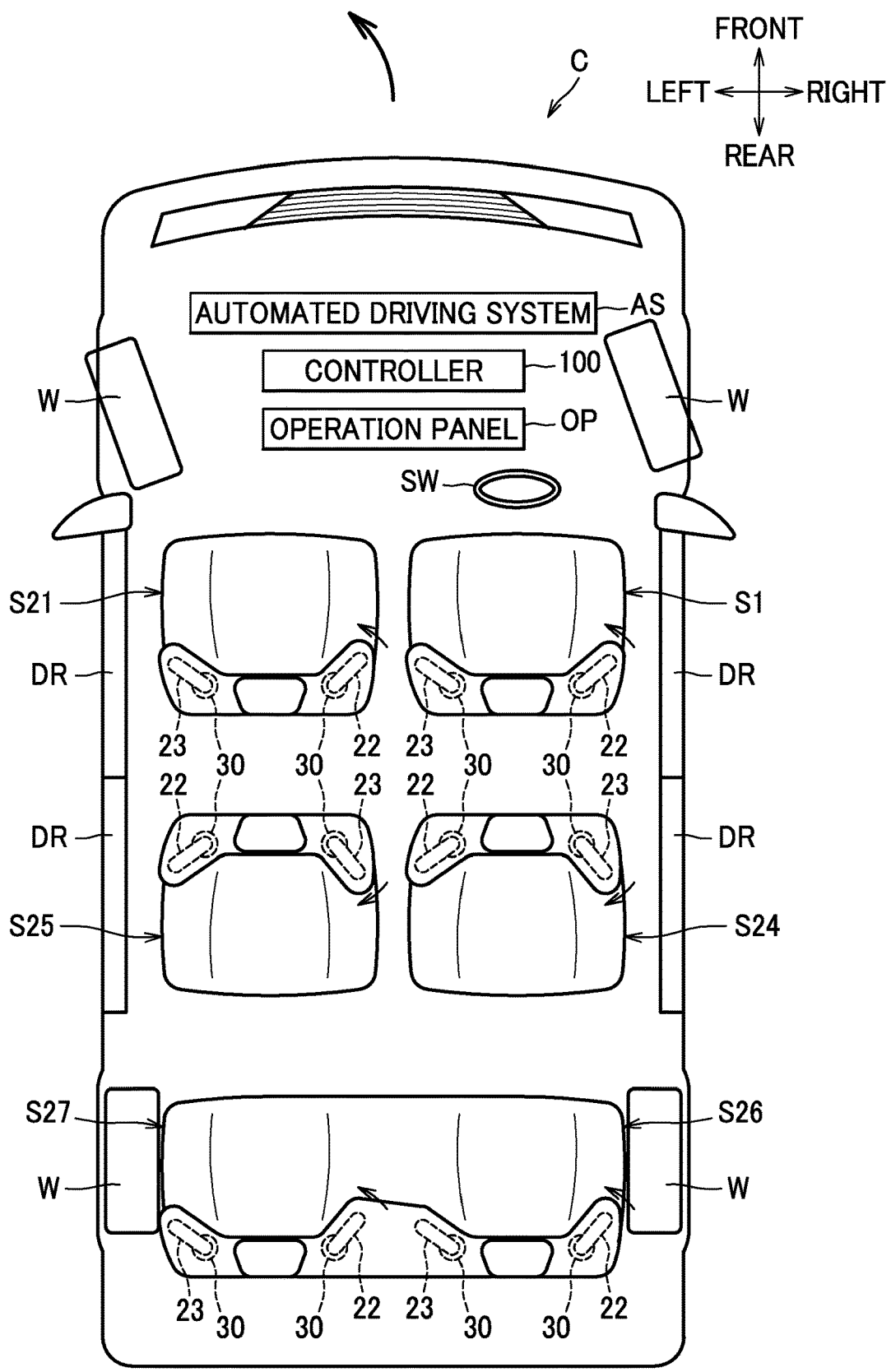
FIG. 15 is a view showing a vehicle in which middle seats are turned front side back.

The middle row seats S24, S25 may be permitted to swivel relative to the car body, and thus get turned their rest surfaces backward as shown in FIG. 15. In this configuration, the controller 100 may further include an orientation detection unit configured to detect orientations of the middle row seats S24, S25, and the run-time posture support unit is configured such that if the orientation detection unit detects that the middle row seats S24, S25 are oriented backward, then the side portion frame 23 is turned when a left turn is made, and the side portion 22 is turned when a right turn is made. Moreover, for example, in a state where the middle row seat S24 is oriented frontward (see FIG. 12), the side portion frame 22 closer to the doorway is turned when the boarding/alighting assisting control is executed, while if the orientation detection unit detects that the middle row seat S24 is oriented backward, then the boarding/alighting assisting unit contrariwise (contrary to the state where it is oriented frontward) causes the side portion frame 23 relocated to a position closer to the doorway (door DR) to be turned accordingly.

Figure 16:
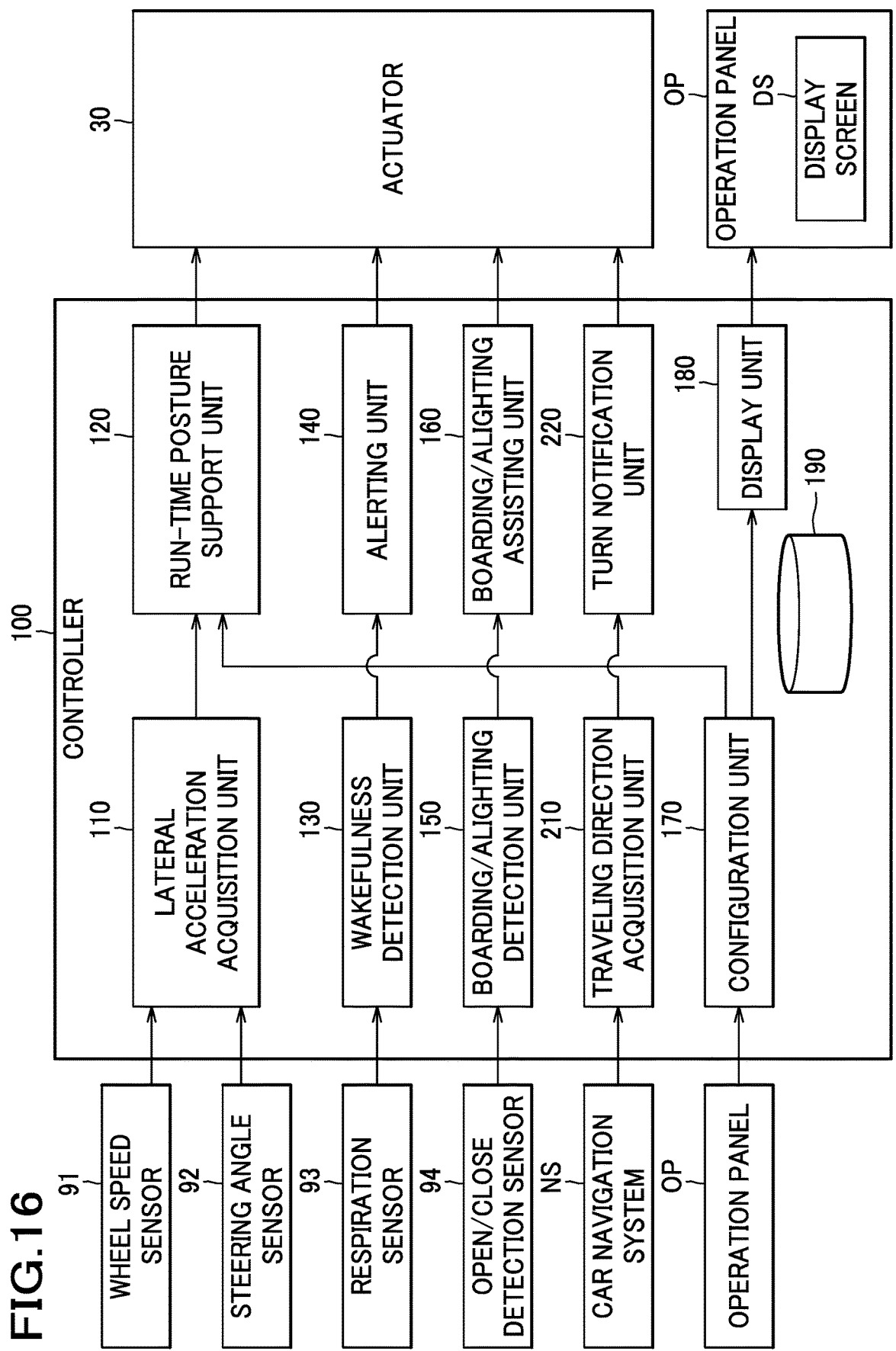
FIG. 16 is a block diagram of a controller according to another embodiment.

Furthermore, as shown in FIG. 16, the controller 100 further includes a traveling direction information acquisition unit 210 and a turn notification unit 220.

The traveling direction information acquisition unit 210 is a unit configured to acquire information on a traveling direction in which the car C is headed. To be more specific, the traveling direction information acquisition unit 210 acquires information on the traveling direction of the car C from a car navigation system NS installed in the car C, specifically, information on a curve, intersection, or the like which may be located in the traveling direction of the car C.

The turn notification unit 220 is a unit configured to execute a turn notification control under which based on the information on the traveling direction acquired by the traveling direction information acquisition unit 210, the actuator 30 of the driver's seat S1 is regulated to change the orientation of the rest surface of the seat back SB, thereby notifying an occupant of the turn, before the car C actually makes a turn. To be more specific, the turn notification unit 220 executes a turn notification control if the traveling direction information acquisition unit 210 detects information indicating that a curve, intersection, or the like is located in the traveling direction of the car C.

To elaborate, the turn notification unit 220 predicts the direction of turn of the car C from information on the traveling direction of the car C, detected by the traveling direction information acquisition unit 210. If the predicted direction of turn is the left, the turn notification unit 220 then causes the right actuator 30 of the driver's seat S1 to rotate in the normal direction, to turn the side portion frame 22 forward from the normal position to the first middle position (0.5), pushing the seat side portion 12 forward, thereby orienting the rest surface of the seat back SB to the left, and thereafter, causes the right actuator 30 of the driver's seat S1 to rotate in the reverse direction, to turn the side portion frame 22 backward from the first middle position to the normal position, thereby restoring the orientation of the rest surface of the seat back SB. If the predicted direction of turn is the right, the turn notification unit 220 then causes the left actuator 30 of the driver's seat S1 to rotate in the normal direction, to turn the side portion frame 23 forward from the normal position to the first middle position (0.5), pushing the seat side portion 13 forward, thereby orienting the rest surface of the seat back SB to the right, and thereafter, causes the left actuator 30 of the driver's seat S1 to rotate in the reverse direction, to turn the side portion frame 23 backward from the first middle position to the normal position, thereby restoring the orientation of the rest surface of the seat back SB. The turn notification unit 220 repeats this series of operations several times under the turn notification control. This can cause the driver to be pushed several times toward the direction of turn by the seat side portion 12, 13, thus can notify the driver of the turn, specifically, a turn that is about to be made, and a direction of that turn.

With this configuration, the driver can be notified of a turn to be made by the car C before the car C actually makes the turn, so that missing of a turn at an intersection or the like can be averted, and the occupant can be made ready in advance to assume a posture responsive to the direction of the turn. Accordingly, the comfort can be improved.

It is to be understood that the amount of turn of the side portion frame 22, 23 to be set for this configuration would desirably be at such a level as the driver would not feel uncomfortable; therefore, the discussion extended herein is directed to an exemplified configuration in which a small amount of turn, for example, such as a turn to the first middle position (0.5), is set, but the amount of turn of the side portion frame 22, 23 is not limited thereto.

The turn notification unit 220 may be configured to change the amount of turn of the side portion frame 22, 23 in accordance with the position of the car C away from a starting point of turn such as the entrance of the curve or the intersection. For example, the turn notification unit 220 may be configured such that the side portion frame 22, 23 is turned from the normal position to the first middle position (0.5) at a first point that is, for example, 50 meters before the starting point of turn, the side portion frame 22, 23 is turned from the normal position to the first forward position (1) at a second point closer to the starting point of turn than the first point, that is, for example, 25 meters before the starting point of turn, and the side portion frame 22, 23 is turned from the normal position to the second forward position (2) at a third position closer to the starting point of turn than the second point, that is, for example, 15 meters before the starting point of turn. In this way, the amount of turn of the side portion frame 22, 23 is increased with decreasing distance to the starting point of turn and the amount of pushing forward of the seat side portion 12, 13 is gradually increased, whereby the turn can be notified effectively, and the missing of a turn or the like can be averted. Moreover, in this configuration, the turn notification unit 220 may be configured such that the amount of turn of the side portion frame 22, 23 at the second point and the third point is set to be smaller, or the actuator 30 is not operated at the second point and the third point, if it is detected that the driver begins manipulating a turn-signal lever in preparation for making a turn. In this way, the unnecessary operation of the actuator 30 can be restricted, so that the discomfort or the like which would be experienced by the driver can be suppressed.

The turn notification unit 220 may be configured such that the driver is notified of the turn, not by causing the seat side portion 12, 13 to push the driver several times in the direction of the turn, but by any other means, for example, by gradually increasing the amount of turn of the side portion frame 22, 23 with decreasing distance to the entrance of the curve, the intersection, or the like, so as to gradually increase the amount of pushing forward of the seat side portion 12, 13. In this configuration, the controller 100 may be configured such that before the car C begins to make a turn, the turn notification control is executed under which the amount of pushing forward of the seat side portion 12, 13 is gradually increased, and after the car C begins to make a turn, continuously, the run-time posture support control is executed without restoring the seat side portion 12, 13 to the normal position.

The turn notification unit 220 may be configured to execute the turn notification control for the second seats S2 other than the driver's seat S1. In this configuration, it is preferable that for the second seat S2, before the car C begins to make a turn, the turn notification unit 220 executes the turn notification control under which the amount of pushing forward of the seat side portion 12, 13 is gradually increased, and after the car C begins to make a turn, continuously, the run-time posture support control is executed without restoring the seat side portion 12, 13 to the normal position. In this way, an abrupt motion of the seat side portion 12, 13 of the second seat S2 can be avoided, and the comfort can be improved.

The turn notification unit 220 may also be configured such that if the predicted direction of turn is the left, then the following operations are repeated several times: the left actuator 30 that is in the position of the same left (as is the direction of turn) is caused to rotate in the normal direction to turn the side portion frame 23 forward thereby pushing the seat side portion 13 forward; and thereafter, the left actuator 30 is caused to rotate in the reverse direction to turn the side portion frame 23 backward, thereby restoring the seat side portion 13. If the predicted direction of turn is the right, the right actuator 30 is operated. In this way, the turn notification unit 220 may be configured to cause the seat side portion 12, 13 at the position corresponding to the direction of turn to push the driver.

The turn notification unit 220 may be configured such that if the configuration unit 170 has set the amount of turn of the side portion frame 22, 23 (the amount of change in orientation of the rest surface of the seat back SB) by the operation of an occupant, the actuator 30 is regulated according to the amount of turn set by the configuration unit 170. The turn notification unit 220 may be configured such that if the configuration unit 170 has prohibited the execution of the turn notification control by the operation of an occupant, the turn notification control is turned off.

The car seat S may include a plurality of support portions S11 to S14 provided to support different regions of an occupant, as shown in FIG. 17(a), and be configured such that the orientations of the rest surfaces of the support portions S11 to S14 are respectively changeable individually. To be more specific, the seat back SB includes a lumbar region support portion S11 provided to support a lumbar region of an occupant, a shoulder region support portion S13 provided above the lumbar region support portion S11 to support a shoulder region of the occupant, and a chest region support portion S12 provided between the lumbar region support portion S11 and the shoulder region support portion S13 to support a chest region (region between the lumbar region and the shoulder region) of the occupant; and the headrest HR includes a head region support portion S14 provided to support a head region of the occupant.

In the left and right side portions within each support portion S11, S12, S13, S14 are disposed a pair of left and right support members 42, 43 and actuators 30A, 30B.

The support member 42, 43 is a plate member of which a laterally inner end portion is rotatably connected to a frame (not shown) of the seat back SB or the head rest HR, so that a laterally outer end portion thereof is swingable forward and backward. The actuator 30A, 30B is configured to actuate and cause the corresponding support member 42, 43 to be turned forward and backward, and cause the rest surface of the support portion S11 to S14 to be pushed forward or restored back, so that the orientation of the rest surface of the corresponding support portion S11 to S14 is changeable to the left or to the right. Hereupon, the lumbar region is an example of a first portion of an occupant, the lumbar region support portion S11 is an example of a first support portion, and the actuator 30A, 30B of the lumbar region support portion S11 is an example of a first actuator. The shoulder region, chest region and head region are examples of a second portion, different from the first portion, of the occupant, the chest region support portion S12, the shoulder region support portion S13 and the head region support portion S14 are examples of a second support portion, and the actuators 30A, 30B of the support portions S12 to S14 are examples of a second actuator.

The controller 100 is configured to individually regulate the amount of actuation of the total eight actuators 30A, 30B disposed in the support portions S11 to S14. Accordingly, the car seat S is configured such that the orientations of the rest surface of the respective support portions S11 to S14 can be changed individually.

The run-time posture support unit of the controller 100 is configured to set the amounts of change in orientation of the rest surfaces of the support portions S12 to S14 to be smaller than the amount of change in orientation of the rest surface of the lumbar region support portion S11, when the run-time posture support control is executed. To be more specific, the run-time posture support unit causes the actuators 30A, 30B of the support portions S12 to S14 to operate with an amount of actuation computed by multiplying the amount of actuation of the actuator 30A, 30B of the lumbar region support portion S11 by a coefficient smaller than 1, when the run-time posture support control is executed. By way of example, the actuator 30A, 30B of the chest region support portion S12 is caused to operate with an amount of actuation computed by multiplying the amount of actuation of the actuator 30A, 30B of the lumbar region support portion S11 by a coefficient of 0.9; the actuator 30A, 30B of the shoulder region support portion S13 is caused to operate with an amount of actuation computed by multiplying the amount of actuation of the actuator 30A, 30B of the lumbar region support portion S11 by a coefficient of 0.8; and the actuator 30A, 30B of the head region support portion S14 is caused to operate with an amount of actuation computed by multiplying the amount of actuation of the actuator 30A, 30B of the lumbar region support portion S11 by a coefficient of 0.5. Herein, the coefficients may be predetermined by making a test run, simulation, or the like.

With this configuration, when the car C makes a turn, several regions of the occupant can be satisfactorily received respectively by the properly oriented rest surfaces of the corresponding support portions S11 to S14. Accordingly, the comfort can be improved.

The run-time posture support unit may be configured such that when the run-time posture support control is executed, if the amount of actuation of the actuator 30A, 30B (amount of change in orientation of the rest surface) is smaller, then the amounts of actuation of the actuators 30A, 30B of the support portions S11 to S14 are equalized, while if the amount of actuation of the actuator 30A, 30B is greater, then the amount of actuation of the actuators 30A, 30B of the support portions S12 to S14 is computed by multiplying by a coefficient or otherwise set to be smaller than the amount of actuation of the actuator 30A, 30B of the lumbar regions support portion S11. The run-time posture support unit may be configured such that the actuator 30A, 30B, for example, of the head region support portion S14 is operated with lower speed than the speed with which those of the other support portions S11 to S13 are operated. With this configuration, discomfort which would be experienced by the occupant may be suppressed.

The above embodiment has been described on the premise that the wakefulness detection unit 130 is configured to detect a condition of wakefulness of a driver seated on the driver's seat S1, but this is not a prerequisite in essence. For example, a respiration sensor may be provided in a second seat that is a seat other than the driver's seat, and the wakefulness detection unit may be configured to detect a condition of wakefulness of an occupant seated on the second seat, specifically, whether or not the occupant seated on the second seat is asleep, based on a signal from the respiration sensor. In this configuration, the run-time posture support unit may be configured such that the amount of turn of the side portion frame is set to be greater if the wakefulness detection unit detects that the occupant seated on the second seat is asleep (i.e., worsening of the condition of wakefulness of the occupant), than if detected not asleep, under the run-time posture support control. For example, as shown in FIG. 18(a), the run-time posture support unit may be configured such that an amount of turn of the side portion frame of the passenger seat S21 to be set if an occupant seated on the passenger seat S21 is asleep is computed by adding 0.5 to the amount of turn to be set if the occupant is not asleep, and the amount of turn of the side portion frame of the rear seat S22, S23 to be set if an occupant seated on the rear seat S22, S23 is asleep is computed by adding 1.5 to the amount of turn to be set if the occupant is not asleep. Furthermore, as shown in FIG. 18(b), the run-time posture support unit may be configured such that the amount of turn of the side portion frame of the middle row seat S24, S25 or the third row seat S26, S27 to be set if an occupant seated thereon is asleep is computed by adding 1.5 to the amount of turn to be set if the occupant is not asleep. The run-time posture support unit may be configured to cause the actuator to operate with lower speed if an occupant seated on the second seat that is a seat other than the driver's seat is asleep than if the occupant is not asleep. The run-time posture support unit may also be configured such that if an occupant seated on the second seat is asleep when the run-time posture support control is executed, the actuator for the driver's seat only is caused to operate and the actuators for the second seats are not caused to operate.

The above embodiment has been described on the premise that the run-time posture support unit 120 is configured to determine that an excessive turn beyond a predetermined limit has been made, based on the lateral acceleration GC, but this is not a prerequisite in essence. For example, the run-time posture support unit may be configured to determine that an excessive turn beyond a predetermined limit has been made, based on a steering angle. To be more specific, one alternative configuration may be such that if a magnitude of the steering angle is equal to or greater than a steering angle threshold value, it is determined that an excessive turn beyond a predetermined limit has been made, and a run-time posture support control is executed. In this configuration, the set values for the run-time posture support control may be set in multiple stages in accordance with the magnitude of the steering angle, that is, set to be greater if the turn is sharp, and less if the turn is gentle. Furthermore, in addition to the magnitude of the steering angle, the vehicle speed may be taken into account. For example, as shown in FIG. 19, when the run-time posture support control is executed, the side portion frame of the driver's seat S1 may be turned to the first forward position (1) if a turn made is gentle (steering angle is less) during low-speed driving, to the second forward position (2) if a turn made is sharp (steering angle is greater) during low-speed driving, to the second middle position (1.5) if a turn made is gentle (steering angle is less) during high-speed driving, and to the third forward position (3) if a turn made is sharp (steering angle is greater) during high-speed driving. In one example, the steering angle that is less refers to a steering angle equal to or greater than a first steering angle threshold value, and the steering angle that is greater refers to a steering angle equal to or greater than a second steering angle threshold value that is greater than the first steering angle threshold value. The situation referred to by "during low-speed driving" is a situation in which the vehicle speed V is lower than a speed threshold value Vth, and the situation referred to by "during high-speed driving" is a situation in which the vehicle speed V is equal to or higher than the speed threshold value Vth.

The above embodiment has been described on the premise that the run-time posture support unit 120 is configured to set an amount of turn of the side portion frames 22, 23 of the rear seats S22, S23 to be greater than an amount of turn of the side portion frame 22, 23 of the passenger seat S21, when the run-time posture support control is executed, but this is not a prerequisite in essence. For example, the run-time posture support unit 120 may be configured such that an amount of turn of the side portion frames of the rear seats and an amount of turn of the side portion frame of the passenger seat are equal (to have the same amount of turn), when the run-time posture support control is executed.

Furthermore, the controller 100 may be configured such that when an occupant operates the operation panel OP or otherwise switches the driving mode of the car C from one of the autonomous driving mode and the manual driving mode to the other, the actuator 30 is regulated to notify the occupant that the driving mode has been switched. For example, the controller 100 may be configured to respond to the effected change in the driving mode and repeatedly performs a series of operations once or a few times: first, the right actuator 30 is caused to rotate in the normal direction and in the reverse direction to push the seat side portion 12 forward and restore the same back, next, causes the left actuator 30 to rotate in the normal direction and in the reverse direction to push the seat side portion 13 forward and restore the same back. These operations may be performed in such a manner that the actuator 30 is operated with a small amount of turn, for example, from the normal position to the first middle position (0.5), and with a speed higher than the speed with which the actuator 30 is operated under the run-time posture support control executed by the run-time posture support unit 120.

Although the above-described embodiment illustrates an exemplary configuration in which the alerting unit 140 causes the left and right actuators 30 of the driver's seat S1 to rotate alternately in the normal direction and in the reverse direction to change the orientation of the rest surface of the seat back SB alternately to the left and to the right under the alert control, the operation pattern of the actuator for the alert control is not limited thereto. For example, an alternative pattern of operations to be repeated may be such that: the right actuator 30 is caused to rotate in the normal direction to some small extent, then tentatively suspended for a while, and further caused to rotate in the normal direction to push the seat side portion 12 forward in two steps; thereafter, the right actuator 30 is caused to rotate in the reverse direction to restore the seat side portion 12 back to the original position; next, the left actuator 30 is caused to rotate in the normal direction to some small extent, then tentatively suspended for a while, and further caused to rotate in the normal direction to push the seat side portion 13 forward in two steps; thereafter, the left actuator 30 is caused to rotate in the reverse direction to restore the seat side portion 13 back to the original position. Another alternative pattern of operations to be repeated may be such that: the right actuator 30 is caused to make two reciprocatory rotations, in the normal direction, then in the reverse direction, again in the normal direction, and then in the reverse direction to push the seat side portion 12 forward twice; next, the left actuator 30 is caused to make two reciprocatory rotations, in the normal direction, then in the reverse direction, again in the normal direction, and then in the reverse direction to push the seat side portion 13 forward twice. Yet another alternative pattern of operations to be repeated may be such that: the right actuator 30 is caused to make two reciprocatory rotations, in the normal direction, then in the reverse direction, again in the normal direction, and then in the reverse direction to push the seat side portion 12 forward twice; thereafter, the left actuator 30 is caused to make one reciprocatory rotation, in the normal direction, and then in the reverse direction to push the seat side portion 13 forward once; next, the right actuator 30 is caused to make one reciprocatory rotation, in the normal direction, and then in the reverse direction, to push the seat side portion 12 forward once; thereafter, the left actuator 30 is caused to make two reciprocatory rotations, in the normal direction, then in the reverse direction, again in the normal direction, and then in the reverse direction to push the seat side portion 13 forward twice. Still another alternative pattern of operations to be repeated may be such that: the right actuator 30 is caused to make one reciprocatory rotation, in the normal direction and then in the reverse direction, to push the seat side portion 12 forward once; thereafter, the left actuator 30 is caused to make two reciprocatory rotations, in the normal direction, then in the reverse direction, again in the normal direction, and then in the reverse direction, to push the seat side portion 13 forward twice.

In the above described embodiment, the wakefulness detection unit is described as being a unit configured to detect a condition of wakefulness of an occupant based on a signal received from the respiration sensor 93 by way of example, but not limited thereto. For example, the wakefulness detection unit may be any appropriate unit available to a person skilled in the art, such as a unit configured to detect a condition of wakefulness from an image taken by shooting a face of an occupant, or a unit configured to detect a condition of wakefulness from data on heartbeat of an occupant.

In the above-described embodiment, the boarding/alighting detection unit is described as being a unit configured to detect boarding into and/or alighting from the car C, of a passenger, wherein such detection occurs if it is detected that the door DR has been opened based on a signal received from the open/close detection sensor 94, but not limited thereto. The boarding/alighting detection unit may be a unit configured to predict the boarding and/or alighting of a passenger to activate the boarding/alighting assisting unit earlier, for example, a unit configured to detect the boarding into and/or alighting from a car, of a passenger, if the door is unlocked.

Referring to FIG. 5, the car seat S may be configured such that when the boarding/alighting assisting control is executed, particularly when a passenger is boarding into the car C, conditioned air such as cool air or warm air is blown out from the surface of the seat side portion 12 laterally outwardly, i.e., toward the passenger who is going to board into the car C. To be more specific, the controller 100 includes an occupation detection unit configured to detect whether or not an occupant is seated on the car seat S; the boarding/alighting assisting unit is configured such that if the boarding/alighting detection unit detects that the door DR has been opened and the occupation detection unit detects that no occupant is seated on the car seat S, then it is determined that a passenger is coming aboard, and thus the rest surface of the seat back SB is oriented toward the doorway DE and conditioned air is blown out from the surface of the seat side portion 12. On the other hand, the boarding/alighting assisting unit is configured such that if the boarding/alighting detection unit detects that the door DR has been opened and the occupation detection unit detects that an occupant is seated on the car seat S, then it is determined that a passenger (the occupant) is alighting, and thus the rest surface of the seat back SB is oriented toward the doorway DE but no air is blown out from the surface of the seat side portion 12. With this configuration, the comfort of a passenger boarding into the car C can be improved. It is to be understood that the occupation detection unit may be configured to detect whether or not an occupant is seated on the car seat S, for example, based on an output signal received from a weight detection sensor, a pressure detection sensor or the like provided in the seat cushion SC, or any other portion.

The above embodiment has been described on the premise that the actuator 30 is configured to actuate part (side portion frame 22, 23) of the seat side portion 12, 13 and thereby rendered capable of changing an orientation of the rest surface of the seat back SB, but this is not a prerequisite in essence. For example, the actuator may be configured to move the entire body of the seat side portion and thereby rendered capable of changing an orientation of the rest surface of the seat back SB. The actuator may be configured to turn or otherwise move the entire body of the seat back and thereby rendered capable of changing an orientation of the rest surface of the seat back. The actuator may be configured to be capable of changing an orientation of the rest surface, not of the seat back but of the seat cushion. The orientation of the rest surface of the seat cushion may be changed, for example, by moving at least part of the seat cushion. The car seat may be configured such that both of the orientation of the rest surface of the seat back and the orientation of the rest surface of the seat cushion are rendered changeable. The actuator may be configured to be capable of changing the orientation of the rest surface by turning or otherwise moving an entire body of the seat.

Mechanism for changing an orientation of a rest surface of a car seat is not limited to the mechanism described in relation to the above embodiment. For example, a mechanism configured to cause a plate member disposed between left and right side frames to be oriented to the left or to the right thereby changing an orientation of a rest surface to the left or to the right as disclosed in Patent Documents 1 to 3 may be adopted. A side support device of a side support actuating mechanism as disclosed in Patent Document 4 may also be adopted.

In the above-described embodiment, the vehicle seat is described as being a car seat S installed in an automobile, but not limited thereto; the vehicle seat may be a seat installed in a vehicle other than an automobile, for example, in a railcar, ship, aircraft, etc.

Furthermore, any of the elements explained in relation to the above-described embodiments and modified examples may be implemented in combination as desired.

The invention claimed is:

1. A vehicle seat, installed within a vehicle, comprising:
an actuator capable of changing an orientation of a rest surface laterally by moving at least part of the seat; and
a controller configured to exercise control over the actuator,
wherein the controller comprises:
a run-time posture support unit configured to execute a run-time posture support control under which, when the vehicle makes a turn, the actuator is regulated to cause the rest surface to be oriented in a direction of the turn;
an open/close detection sensor configured to detect an opening and a closing of at least one door of the vehicle;
an occupation detection unit configured to detect whether a passenger is seated on the vehicle seat; and
a boarding/alighting assisting unit configured to execute a boarding/alighting control to regulate the actuator to orient the rest surface toward a doorway of the vehicle, if the open/close detection sensor detects that at least one door of the vehicle is open and the occupation detection unit detects that a passenger is seated on the vehicle seat,
wherein the vehicle seat is capable of blowing out conditioned air toward a passenger boarding into the vehicle, and
wherein the controller is configured to execute the boarding/alighting control and to cause conditioned air to blow out toward a passenger boarding into the vehicle, if the open/close detection sensor detects that a door has been opened and the occupation detection unit detects that a passenger is not seated on the vehicle seat.

2. The vehicle seat according to claim 1, wherein the controller further comprises:
a wakefulness detection unit configured to detect a condition of wakefulness of a driver; and
an alerting unit configured to execute an alert control under which, when the wakefulness detection unit detects a worsening condition of wakefulness of the driver, the actuator is regulated to change an orientation of the rest surface,
wherein an amount of the change in orientation of the rest surface when the alert control is executed is greater than an amount of a change in orientation of the rest surface set when the alert control is not executed.

3. The vehicle seat according to claim 2, wherein an amount of a change in orientation of the rest surface set when the boarding/alighting assisting control is executed is greater than the amount of the change in orientation of the rest surface set when the alert control is executed.

4. The vehicle seat according to claim 1, wherein the run-time posture support unit is configured such that an amount of a change in orientation of the rest surface set when the run-time posture support unit executes the run-time posture support control is greater when the vehicle is in an autonomous driving mode with an automatic steering feature enabled than when the vehicle is in a manual driving mode with the automatic steering feature disabled.

5. The vehicle seat according to claim 1, wherein the controller further comprises:
a traveling direction information acquisition unit configured to acquire information of a traveling direction in which the vehicle is directed; and
a turn notification unit configured such that, based on the information acquired by the traveling direction information acquisition unit, the actuator is regulated to change an orientation of the rest surface to notify an occupant of a turn, before the vehicle makes the turn.

6. The vehicle seat according to claim 1, further comprising:
a seat central portion and left and right seat side portions, wherein
the left seat side portion and the right seat side portion are respectively provided at left and right sides of the seat central portion, and
the left seat side portion and the right seat side portion are so shaped as to jut out farther than the seat central portion to a side on which an occupant is to be seated, in a normal position,
wherein the actuator is configured to move at least part of the seat side portions from the normal position in a direction toward or away from the occupant to be seated, to thereby change an orientation of the rest surface.

7. The vehicle seat according to claim 1,
wherein the controller further comprises:
a configuration unit configured to set an amount of a change in orientation of the rest surface based upon information inputted manually by an occupant, and
wherein the run-time posture support unit is configured such that, when the configuration unit has set the amount of change in orientation of the rest surface, the actuator is regulated in accordance with the amount of change in orientation of the rest surface set by the configuration unit.

8. The vehicle seat according to claim 7, wherein the configuration unit is configured to set the amount of the change in orientation of the rest surface at any value selected among amounts of change including zero.

9. The vehicle seat according to claim 1, further comprising:
   a seat cushion;
   a seat back; and
   a headrest, wherein
      the seat cushion is constructed of a seat cushion frame upholstered with padding and covering,
      the seat back is constructed of a seat back frame upholstered with padding and covering, and
      the seat back frame includes a central portion frame constituting a frame of a seat central portion and side portion frames constituting frames of left and right seat side portions,
      wherein the left and right side portion frames have rear end portions and front end portions, respectively, which are so provided that the rear end portions are pivotally joined to the central portion frame whereby the front end portions are made swingable forward and backward.

10. A vehicle comprising the vehicle seat according to claim 1.

11. A method for manufacturing a vehicle seat, installed within a vehicle, comprising:
   providing a seat frame;
   providing on the seat frame an actuator capable of changing an orientation of a rest surface laterally by moving at least a part of the seat;
   providing a controller configured to control the actuator; and
   installing in the controller a program that causes the controller to function as:
      a run-time posture support unit configured to execute a run-time posture support control under which, when the vehicle makes a turn, the actuator is regulated to cause the rest surface to be oriented in a direction of the turn;
      an open/close detection sensor configured to detect an opening and a closing of at least one door of the vehicle;
      an occupation detection unit configured to detect whether a passenger is seated on the vehicle seat; and
      a boarding/alighting assisting unit configured to execute a boarding/alighting control to regulate the actuator to orient the rest surface toward a doorway of the vehicle, if the open/close detection sensor detects that at least one door of the vehicle is open and the occupation detection unit detects that a passenger is seated on the vehicle seat,
   wherein the vehicle seat is further capable of blowing out conditioned air toward a passenger boarding into the vehicle, and
   wherein the controller is configured to execute the boarding/alighting control and to cause conditioned air to blow out toward a passenger boarding into the vehicle, if the open/close detection sensor detects that a door has been opened and the occupation detection unit detects that a passenger is not seated on the vehicle seat.

* * * * *